(12) United States Patent
Meyer et al.

(10) Patent No.: US 10,784,975 B1
(45) Date of Patent: Sep. 22, 2020

(54) SYSTEMS AND METHODS FOR AUTOMATICALLY TUNING A RADIO SYSTEM TO A PREFERRED CHANNEL

(71) Applicant: Toyota Motor North America, Inc., Plano, TX (US)

(72) Inventors: Scott Meyer, Allen, TX (US); Joshua Babcock, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/541,457

(22) Filed: Aug. 15, 2019

(51) Int. Cl.
| H04H 20/71 | (2008.01) |
| H04H 60/46 | (2008.01) |
| H04L 29/08 | (2006.01) |
| H04B 1/08 | (2006.01) |

(52) U.S. Cl.
CPC ............ *H04H 60/46* (2013.01); *H04B 1/082* (2013.01); *H04H 20/71* (2013.01); *H04L 67/12* (2013.01); *H04L 67/306* (2013.01)

(58) Field of Classification Search
CPC ........ H04H 60/46; H04H 20/71; H04B 1/082; H04L 67/12; H04L 63/306
USPC ...................................................... 455/3.03
See application file for complete search history.

(56) References Cited

U.S. PATENT DOCUMENTS

| 6,021,320 | A * | 2/2000 | Bickford | ............... | H03J 1/0075 |
| | | | | | 455/166.1 |
| 6,101,381 | A * | 8/2000 | Tajima | ................. | G11B 5/0086 |
| | | | | | 455/414.2 |
| 6,407,750 | B1 * | 6/2002 | Gioscia | ................... | G06F 16/40 |
| | | | | | 715/716 |
| 6,556,905 | B1 * | 4/2003 | Mittelsteadt | ........... | G07C 5/008 |
| | | | | | 340/439 |
| 6,748,237 | B1 * | 6/2004 | Bates | ..................... | H04H 60/65 |
| | | | | | 455/161.1 |
| 6,928,308 | B2 * | 8/2005 | Wang | ..................... | H04B 1/082 |
| | | | | | 455/550.1 |
| 7,007,920 | B2 * | 3/2006 | Nishida | ..................... | F01L 9/04 |
| | | | | | 123/90.11 |

(Continued)

FOREIGN PATENT DOCUMENTS

| CN | 105007530 | 10/2015 |
| CN | 105846936 | 8/2016 |

(Continued)

*Primary Examiner* — Hai V Nguyen
(74) *Attorney, Agent, or Firm* — Dinsmore & Shohl LLP

(57) ABSTRACT

Computing devices are disclosed. For example, a computing device includes one or more processors and one or more databases. The computing device includes one or more non-transitory memory modules storing machine-readable instructions that, when executed, cause the one or more processors to: receive a plurality of event flags, wherein each event flag of the plurality of event flags is associated with a respective broadcasted audio signal of a plurality of broadcasted audio signals; compare the plurality of event flags to a user profile stored within the one or more databases, wherein the user profile comprises preference characteristics associated with a user; determine whether one or more event flags matches a set of preference characteristics of the user profile; and transmit a notification signal to a vehicle in response to the one or more event flags matching the set of preference characteristics of the user profile.

18 Claims, 15 Drawing Sheets

(56) References Cited

U.S. PATENT DOCUMENTS

| | | | | |
|---|---|---|---|---|
| 7,116,939 B1* | 10/2006 | Kandler | | H04B 1/082 |
| | | | | 455/41.3 |
| 7,280,296 B2* | 10/2007 | Shirato | | G11B 20/10527 |
| | | | | 360/55 |
| 7,826,799 B2* | 11/2010 | Kolano | | H04M 1/6075 |
| | | | | 324/130 |
| 8,032,072 B2* | 10/2011 | Thibodeau | | G11B 27/034 |
| | | | | 455/160.1 |
| 8,180,277 B2* | 5/2012 | Srinivasan | | H04B 1/034 |
| | | | | 455/3.06 |
| 8,270,904 B2* | 9/2012 | Srinivasan | | H04H 20/62 |
| | | | | 455/41.2 |
| 8,331,966 B2* | 12/2012 | Anzures | | H04H 20/26 |
| | | | | 455/503 |
| 8,473,005 B2* | 6/2013 | Srinivas | | H04M 1/72522 |
| | | | | 455/557 |
| 8,478,288 B2* | 7/2013 | Haghighi | | H03J 1/0008 |
| | | | | 455/456.1 |
| 8,612,539 B1* | 12/2013 | Prager | | G11B 27/034 |
| | | | | 709/217 |
| 8,676,920 B2* | 3/2014 | Bai | | H04L 67/12 |
| | | | | 709/214 |
| 8,682,956 B2* | 3/2014 | Bai | | G06F 16/435 |
| | | | | 709/201 |
| 8,755,763 B2* | 6/2014 | Qureshey | | G06Q 30/0641 |
| | | | | 455/344 |
| 8,977,408 B1* | 3/2015 | Cazanas | | H04L 41/082 |
| | | | | 455/3.03 |
| 9,094,802 B2* | 7/2015 | White | | G06F 3/0482 |
| 9,098,956 B2* | 8/2015 | Lambert | | G08G 1/162 |
| 9,239,866 B2* | 1/2016 | Jurascheck | | H04L 65/4076 |
| 9,280,857 B2* | 3/2016 | Lambert | | G08G 1/162 |
| 9,559,657 B2* | 1/2017 | Jaisimha | | H03G 3/3026 |
| 9,602,624 B2* | 3/2017 | Davis | | G08G 1/096888 |
| 9,786,192 B2* | 10/2017 | Gulash | | G09B 9/052 |
| 9,893,825 B1* | 2/2018 | Rao | | H04W 4/44 |
| 10,355,795 B2* | 7/2019 | Rao | | H04W 4/44 |
| 10,393,076 B1* | 8/2019 | Freeman | | B60K 13/02 |
| 10,535,207 B1* | 1/2020 | Goluguri | | G07C 5/0841 |
| 10,552,117 B1* | 2/2020 | Parekh | | H04R 3/04 |
| 2003/0026344 A1* | 2/2003 | Rindsberg | | H04H 40/90 |
| | | | | 375/260 |
| 2003/0158614 A1* | 8/2003 | Friel | | H04H 20/62 |
| | | | | 700/94 |
| 2004/0068551 A1* | 4/2004 | Hymel | | H04L 69/329 |
| | | | | 709/217 |
| 2004/0116088 A1* | 6/2004 | Ellis | | H04H 60/46 |
| | | | | 455/132 |
| 2004/0171377 A1* | 9/2004 | Engstrom | | G06Q 30/02 |
| | | | | 455/419 |
| 2007/0127726 A1* | 6/2007 | Ellis | | H04H 60/46 |
| | | | | 381/15 |
| 2007/0173293 A1* | 7/2007 | Tran | | H04B 1/3822 |
| | | | | 455/569.1 |
| 2009/0320067 A1* | 12/2009 | Thibodeau | | G11B 27/034 |
| | | | | 725/39 |
| 2010/0100310 A1* | 4/2010 | Eich | | G01C 21/3661 |
| | | | | 701/533 |
| 2010/0178938 A1* | 7/2010 | Ingrassia, Jr. | | H04H 60/51 |
| | | | | 455/456.3 |
| 2010/0267331 A1* | 10/2010 | Ingrassia | | H04H 60/37 |
| | | | | 455/3.04 |
| 2010/0267406 A1* | 10/2010 | Srinivasan | | H04H 20/30 |
| | | | | 455/509 |
| 2010/0279629 A1* | 11/2010 | Srinivasan | | H04H 20/106 |
| | | | | 455/74 |
| 2010/0285763 A1* | 11/2010 | Ingrassia | | H04H 20/08 |
| | | | | 455/185.1 |
| 2015/0088335 A1* | 3/2015 | Lambert | | H04L 67/10 |
| | | | | 701/1 |
| 2015/0310676 A1* | 10/2015 | Lambert | | G07C 5/085 |
| | | | | 709/204 |

FOREIGN PATENT DOCUMENTS

| | | |
|---|---|---|
| DE | 102013006125 | 4/2016 |
| WO | 2009113040 | 9/2009 |

* cited by examiner

SYSTEMS AND METHODS FOR AUTOMATICALLY TUNING A RADIO SYSTEM TO A PREFERRED CHANNEL

FIELD

The present specification generally relates to a radio broadcasting system, and more particularly, to a radio broadcasting system that automatically switches radio channels of a radio system when an event flag associated with an unselected radio channel corresponds to a preference characteristic of a user profile.

BACKGROUND

Conventional radio systems receive broadcasted audio signals at different frequencies and within different frequency bands. The broadcasted audio signals may be received using various radio broadcasting communication protocols including, but not limited to, an amplitude modulation (AM) broadcasting protocol, a frequency modulation (FM) broadcasting protocol, and a satellite radio broadcasting protocol (e.g., XM radio broadcasting protocol). The broadcasted audio signals may include a variety of different content including, but not limited to, news, music, sports, and talk shows.

However, conventional radio systems require a user to manually adjust a tuner of the radio system to select a broadcasted audio signal. In particular, a user must manually adjust a tuner using at least one of an input element (e.g., a dial, a pushbutton, etc.) and a graphical user interface (GUI) element (e.g., a button or other element on a touchscreen display of a vehicle) in order to listen to specific parts of a broadcasted audio signal. As an example, if a user only wants to listen to a sporting event when certain conditions are satisfied (e.g., the user only wants to listen to his or her favorite professional football team during the last five minutes of a game), the user must determine the proper time and then manually adjust the tuner to select the corresponding broadcasted audio signal.

Accordingly, a need exists for a radio system that is automatically tuned to a particular broadcasted audio signal when the broadcasted audio signal includes information indicating that a user desires to listen to the particular broadcasted audio signal.

SUMMARY

In one embodiment, a computing device includes one or more processors and one or more databases. The computing device includes one or more non-transitory memory modules communicatively coupled to the one or more processors and storing machine-readable instructions. When the instructions are executed, the instructions cause the one or more processors to receive a plurality of event flags, wherein each event flag of the plurality of event flags is associated with a respective broadcasted audio signal of a plurality of broadcasted audio signals. When the instructions are executed, the instructions cause the one or more processors to compare the plurality of event flags to a user profile stored within the one or more databases, wherein the user profile includes preference characteristics associated with a user. When the instructions are executed, the instructions cause the one or more processors to determine whether one or more event flags of the plurality of event flags matches a set of preference characteristics of the user profile. When the instructions are executed, the instructions cause the one or more processors to transmit a notification signal to a vehicle in response to the one or more event flags matching the set of preference characteristics of the user profile.

In another embodiment, a method includes receiving a plurality of event flags, wherein each event flag of the plurality of event flags is associated with a respective broadcasted audio signal of a plurality of broadcasted audio signals. The method includes comparing the plurality of event flags to a user profile stored within one or more databases, wherein the user profile includes preference characteristics associated with a user. The method includes determining whether one or more event flags of the plurality of event flags matches a set of preference characteristics of the user profile. The method includes transmitting a notification signal to a vehicle in response to the one or more event flags matching the set of preference characteristics of the user profile.

In yet another embodiment, a vehicle includes a radio system configured to receive a plurality of broadcasted audio signals, wherein the plurality of broadcasted audio signals includes a selected audio signal and one or more unselected audio signals. The vehicle includes one or more processors and one or more databases. The vehicle includes one or more non-transitory memory modules communicatively coupled to the one or more processors and storing machine-readable instructions. When the instructions are executed, the instructions cause the one or more processors to compare one or more event flags to a user profile of the one or more databases, wherein each event flag of the one or more event flags is associated with a respective unselected audio signal of the one or more unselected audio signals, and wherein the user profile includes preference characteristics of a user. When the instructions are executed, the instructions cause the one or more processors to determine whether the one or more event flags matches a set of preference characteristics of the user profile. When the instructions are executed, the instructions cause the one or more processors to select a first event flag of the one or more event flags in response to a determination that the one or more event flags matches the set of preference characteristics of the user profile, wherein the first event flag is selected based on a degree of matching between the one or more event flags and the set of preference characteristics. When the instructions are executed, the instructions cause the one or more processors to identify a first unselected audio signal associated with the first event flag. When the instructions are executed, the instructions cause the one or more processors to generate a notification signal based on the first unselected audio signal.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are generally related to a radio broadcasting system that automatically switches a channel of a radio system when an event flag associated with an unselected audio channel corresponds to a user preference of a user profile. By automatically switching the channel of a radio, the user can selectively listen to desired portions of a particular broadcasted audio signal without manually adjusting a tuner of the radio system. In other embodiments, the radio broadcasting system may generate a notification indicating that an event flag associated with an unselected audio channel corresponds to a user preference of a user profile, and the user may selectively listen to the unselected audio channel by interacting with the notification.

As described herein, the term module may refer to, be part of, or include: an Application Specific Integrated Circuit (ASIC); a digital, analog, or mixed analog/digital discrete or integrated circuit; a combinational logic circuit; a field programmable gate array (FPGA); a processor circuit that executes machine-readable instructions; a memory circuit that stores machine-readable instructions executed by the processor circuit; other suitable hardware components that provide the described functionality; or a combination of some or all of the above.

The functional blocks and/or flowchart elements described herein may be translated into machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either an FPGA configuration or an ASIC, or their equivalents. Accordingly, the functionality described herein may be implemented in any conventional computer programming language, as pre-programmed hardware elements, or as a combination of hardware and software components.

Figure 1:
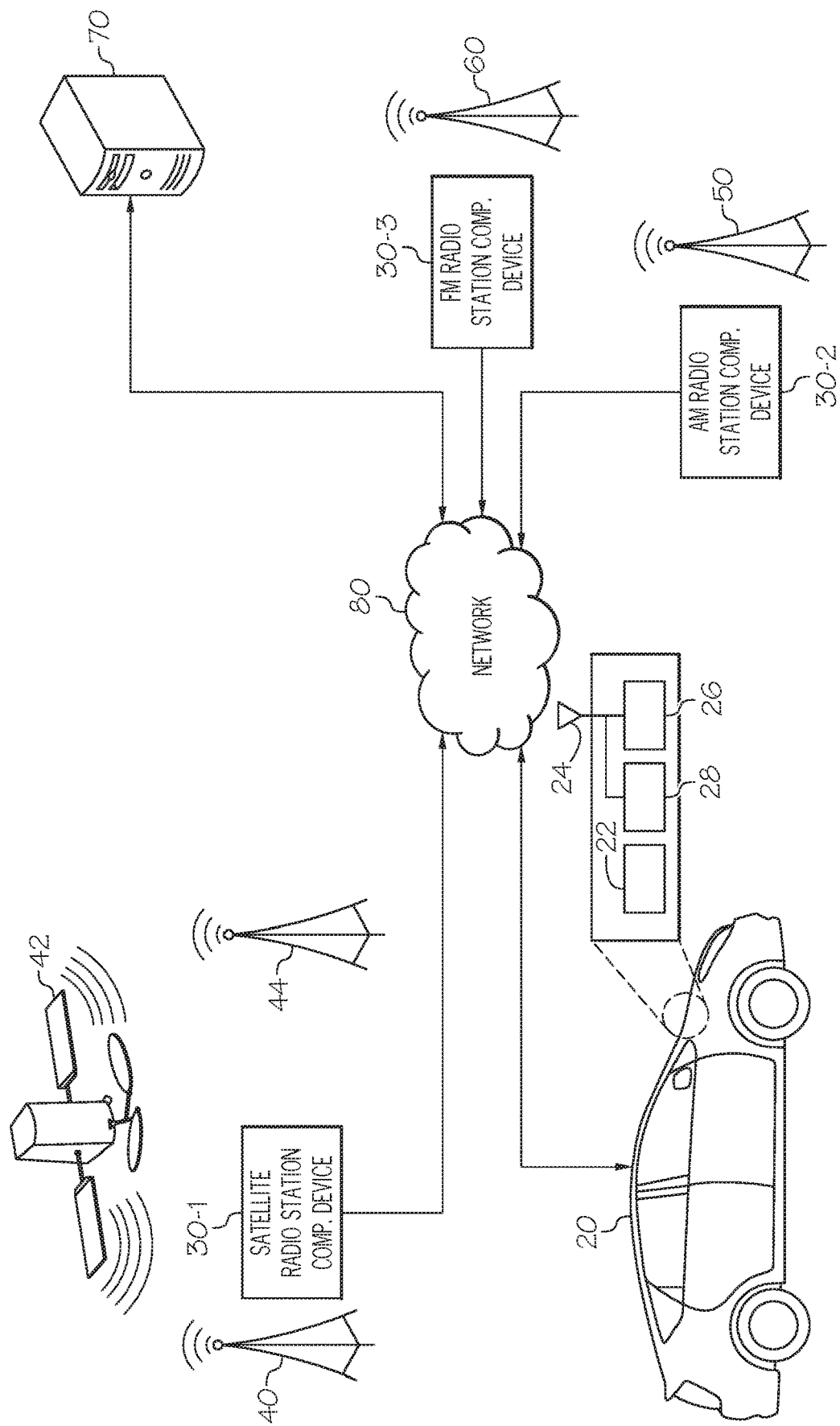
FIG. 1 schematically depicts an example radio broadcasting system according to one or more embodiments shown and described herein.

Referring now to FIG. 1, an example radio broadcasting system 10 is schematically depicted. The radio broadcasting system 10 may include, but is not limited to, a vehicle 20, radio station computing devices 30-1, 30-2, 30-3 (collectively referred to as radio station computing devices 30), a satellite radio uplink transmitter 40, at least one satellite 42, a satellite radio downlink transceiver 44, an AM radio transmitter 50, an FM radio transmitter 60, and a remote computing device 70.

In the illustrated embodiment, the satellite radio uplink transmitter 40, the AM radio transmitter 50, and the FM radio transmitter 60 are configured to broadcast audio signals that are ultimately received by the vehicle 20. As a non-limiting example, the satellite radio uplink transmitter 40 may broadcast a modulated audio signal using a 4.5 MHz frequency band in a frequency range of 7050.5-7072.5 MHz, including endpoints. The audio signal may be modulated using, for example, quadrature phase sift keying (QPSK) modulation or other suitable modulation techniques. Furthermore, the satellite radio uplink transmitter 40 may execute forward error correction functions or channel coding functions to minimize audio signal data errors, and the satellite radio uplink transmitter 40 may encrypt the modulated audio signal to prevent unauthorized users from extracting the modulated audio signal.

The modulated audio signal is then redirected by the at least one satellite 42, which may include a transceiver and other circuitry to receive, process, and broadcast the modulated audio signal toward the satellite radio downlink transceiver 44 using a 12.5 MHz frequency band in a frequency range of 2320-2332.5 MHz. In response to receiving the modulated audio signal, the satellite radio downlink transceiver 44 broadcasts the modulated audio signal to a digital receiver 22 of the vehicle 20. The digital receiver 22, which may be implemented by an integrated circuit, subsequently digitizes, demodulates, error-corrects, and decrypts the modulated audio signal such that a user within the vehicle 20 may tune into the audio signal and listen to the corresponding audio contents.

As another non-limiting example, the AM radio transmitter 50 may broadcast a modulated audio signal using a 10 KHz frequency band in a 550-1720 KHz frequency range, including endpoints. In order to generate the modulated audio signal, an amplitude of a carrier signal may be modulated with the audio signal. The modulated audio signal is received using an antenna 24 of the vehicle 20. Subsequently, an AM receiver 26 that is communicatively coupled to the antenna 24 and tunable to the corresponding transmission frequency is configured to demodulate the modulated audio signal so that a user within the vehicle 20 may listen to the contents of the audio signal.

As another non-limiting example, the FM radio transmitter 60 may broadcast a modulated audio signal in a 200 KHz frequency band in an 88-108 MHz frequency range, including endpoints. In order to generate the modulated audio signal, a carrier signal is modulated with the audio signal. The modulated audio signal is received using the antenna 24 of the vehicle 20. Subsequently, an FM receiver 28 that is communicatively coupled to the antenna 24 and tunable to the corresponding transmission frequency is configured to demodulate the modulated audio signal so that a user within the vehicle 20 may listen to the contents of the audio signal.

In addition to receiving audio signals broadcasted by the satellite radio downlink transceiver 44, the AM radio transmitter 50, and the FM radio transmitter 60, additional data may be transmitted along with the audio signal, including a time, station identification information, program information, etc. As a non-limiting example, a radio data system (RDS) included within the FM radio transmitter 60 may utilize a 57 kHz sub carrier signal within the 88-108 MHz frequency range to transmit digital information corresponding to the station identification information (e.g., FM Channel 106.9 MHz), a title of a song, etc.

While only one satellite radio uplink transmitter 40, satellite radio downlink transceiver 44, AM radio transmitter 50, and FM radio transmitter 60 are schematically depicted, it should be understood that in other embodiments, more than one satellite radio uplink transmitter 40, satellite radio downlink transceiver 44, AM radio transmitter 50, and FM radio transmitter 60 may be included within the radio broadcasting system 10.

In the illustrated embodiment, the satellite radio uplink transmitter 40 may be associated with radio station computing device 30-1; AM radio transmitter 50 may be associated with radio station computing device 30-2; and FM radio transmitter 60 may be associated with radio station computing device 30-3. Although not shown, a radio station computing device 30 may also be associated with the satellite radio downlink transceiver 44.

The radio station computing devices 30 are configured to transmit event flags associated with the respective broadcasted audio signal to the remote computing device 70. As defined herein, event flags may refer to any data signal or packet with information embedded therein, wherein the embedded information is used to identify or represent a characteristic of a broadcasted audio signal. In some embodiments, the event flags are numeric values within a predefined range of numeric values, wherein each numeric value within the predefined range corresponds to a unique characteristic of the broadcasted audio signal. Furthermore, the numeric values and/or predefined range of numeric values may be based on the type of broadcasted audio signal. As a non-limiting example, broadcasted audio signals associated with a music radio station may be assigned a first predefined range of numeric values; broadcasted audio signals associated with a news radio station may be assigned a second predefined range of numeric values; and broadcasted audio signals associated with a sports radio station may be assigned a third predefined range of numeric values.

The radio station computing devices 30 may transmit the event flags to the remote computing device 70 via network 80. In some embodiments, the network 80 may include one or more interface circuits, and the one or more interface circuits may include wired or wireless interfaces that are connected to a local area network (LAN), the Internet, a wide area network (WAN), or combinations thereof. In other embodiments and as described below in further detail with reference to FIGS. 8-11, the radio station computing devices 30 may transmit the event flags directly to the vehicle 20 via the network 80.

In addition to transmitting event flags to the remote computing device 70, a user of the vehicle 20 (e.g., a driver of the vehicle 20, a passenger of the vehicle 20, a previous driver/passenger of the vehicle 20, etc.) may transmit user profile identification information to the remote computing device 70. In some embodiments and as described below in further detail, the user profile identification information may be input (e.g., entering a username and/or password) using a mobile device, such as a laptop, smartphone, PDA, or the like, or a display of the vehicle 20. In response to the inputting the user profile identification information, a vehicle control unit may transmit the user profile identification information to the remote computing device 70, which subsequently identifies a corresponding user profile stored within a user profile database.

In response to receiving the event flags and identifying the corresponding user profile, the remote computing device 70 is configured to compare the event flags to preference characteristics of the identified user profile. As described below in further detail, the preference characteristics may indicate a preferred radio genre (e.g., a news category, a sports category, a music category, a talk show category, etc.) and a preferred condition or event associated with the radio genre. In some embodiments, the preference characteristics may be defined by the corresponding user (e.g., the user may define his or her favorite music genres, artists, songs, sports teams, news radio stations, etc., and events associated therewith, as described below in further detail) or may be determined using a machine-learning or other similar algorithm.

If the comparison indicates that a value of at least one of the event flags matches a set of preference characteristics, the remote computing device 70 may transmit a notification signal to the vehicle 20 via the network 80. The notification signal may cause the vehicle 20 to generate a notification using, for example, the display of the vehicle 20. As described below in further detail, the notification may include one or more graphical user interface (GUI) elements that enable a user to tune into a broadcasted audio signal associated with a first event flag of the at least one event flag matching the set of preference characteristics. As another non-limiting example and as described below in further detail, the notification may automatically switch the radio system of the vehicle 20 from the selected audio signal to the broadcasted audio signal associated with the first event flag.

While the above embodiment describes the remote computing device 70 comparing the event flags to preference characteristics of the identified user profile and transmitting the notification signal to the vehicle 20, in some embodiments, the remote computing device 70 may be removed when the radio station computing devices 30 transmit the event flags directly to the vehicle 20. Accordingly, all of the modules and components of the remote computing device 70 described herein that are configured to compare the event flags to preference characteristics of the identified user profile and transmit the notification signal may be included within the vehicle 20, as described below in further detail with reference to FIGS. 8-11.

Figure 2A:
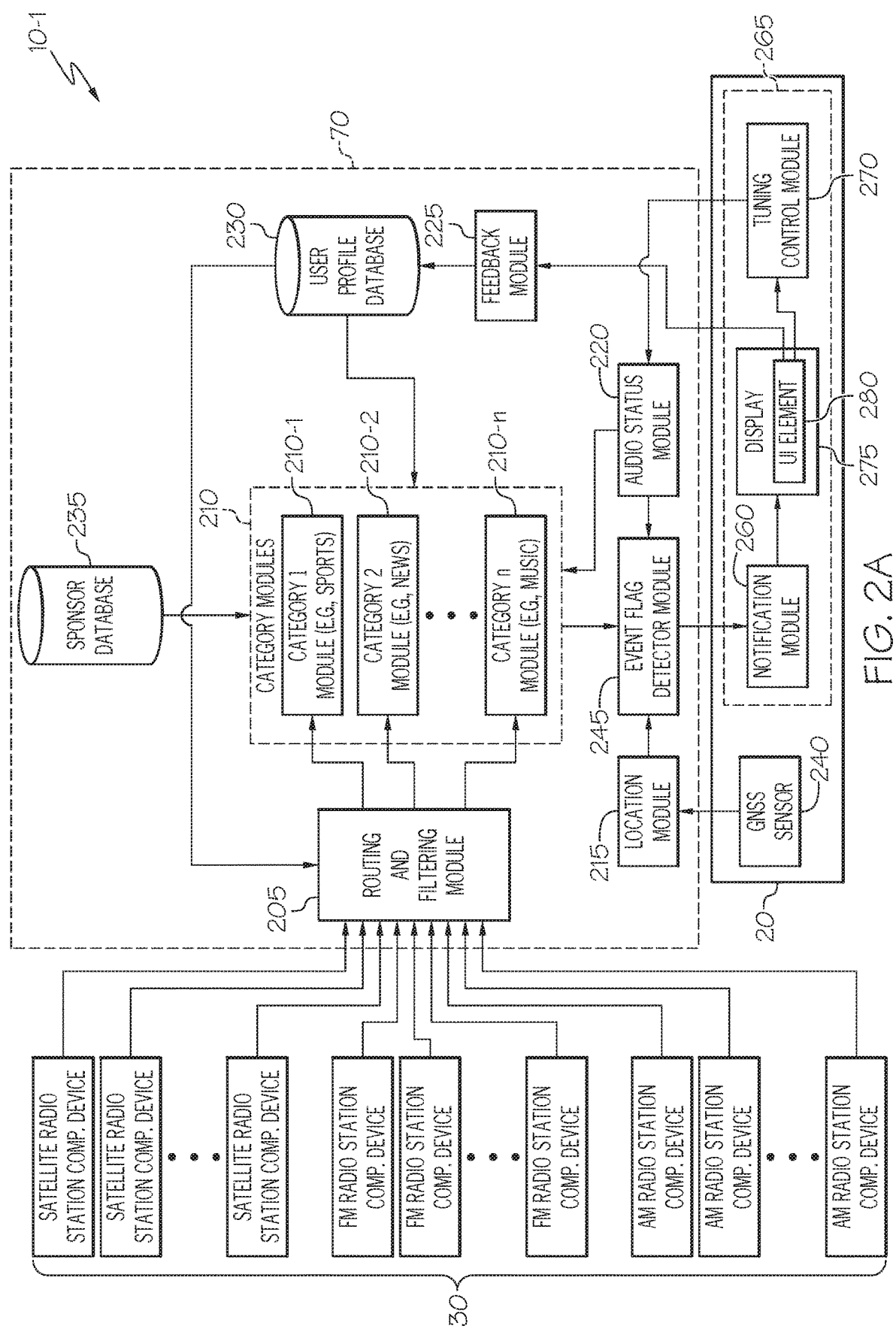
FIG. 2A schematically depicts a functional block diagram of an example radio broadcasting system according to one or more embodiments shown and described herein.

With reference to FIG. 2A, an example functional block diagram of the radio station computing devices 30, the vehicle 20, and the remote computing device 70 of radio broadcasting system 10-1 is schematically depicted. In the illustrated embodiment, the remote computing device 70 includes a routing and filtering module 205, category modules 210-1, 210-2, . . . 210-n (collectively referred to as category modules 210), a location module 215, an audio status module 220, and a feedback module 225.

In the illustrated embodiment, the routing and filtering module 205 of the remote computing device 70 is configured to receive the event flags from the radio station computing devices 30. In some embodiments, a value of an event flag is based on identifying characteristics of the corresponding broadcasted audio signal. As non-limiting examples, a local country radio station currently broadcasting the song titled "Amazed" by Lonestar may be represented with a first event flag having a first value; a sports radio station currently broadcasting a playoff football game between the Dallas Cowboys® and the Philadelphia Eagles® may be represented with a second event flag having a second value; and a news radio station currently broadcasting breaking news related to a natural disaster in California may be represented with a third event flag having a third value.

Figure 2B:
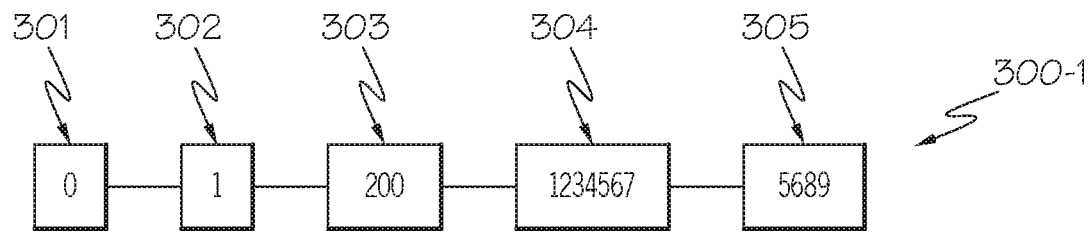
FIG. 2B schematically depicts an example event flag according to one or more embodiments shown and described herein.

In some embodiments, each radio broadcast category may have different event flag formats. As a non-limiting example and as illustrated in FIG. 2B, a first portion 301 of event flag 300-1, which may be a default single-digit number that categorizes the event flag 300-1 as falling within the music category, may be a "0." A second portion 302 of the event flag 300-1, which may be a single-digit number utilized to categorize the event flag 300-1 as falling within a classical genre (e.g., a "0"), a dance genre (e.g., a "1"), or a pop/rock genre (e.g., a "2"), may be a "2." A third portion 303 of the event flag 300-1, which may be a number utilized to categorize the genre as falling within a sub-genre of the corresponding genre, may be a "200" (e.g., the event flag 300-1 falls within the dancing country subgenre). In some embodiments, each sub-genre may be assigned a unique number.

Accordingly, an event flag 300-1 having the first portion 301, the second portion 302, and the third portion 303, respectively, with the values "0-1-200," as shown in FIG. 2B, may indicate that the corresponding broadcasted audio signal is a song in the dancing country sub-genre. As another non-limiting example, an event flag 300-1 having the first portion 301, the second portion 302, and the third portion 303, respectively, with the values "0-0-101" may indicate that the corresponding broadcasted audio signal is in the light orchestra sub-genre.

A fourth portion 304 of the event flag 300-1, which may be utilized to identify an artist within the corresponding sub-genre, may be a "1234567" (e.g., the event flag 300-1 is associated with the artist Lonestar). In some embodiments, each artist of a plurality of artists within a corresponding sub-genre may be assigned a unique number. Furthermore, a fifth portion 305 of the event flag 300-1, which may be utilized to identify a song produced by the corresponding artist, may be a "5689" (e.g., the event flag 300-1 is associated with the song titled "Amazed"). In some embodiments, each song associated with the corresponding artist may be assigned a unique number. Accordingly, the event flag having the value "0-1-200-1234567-5689," as schematically depicted in FIG. 2B, may indicate that the broadcasted audio signal corresponds to the song titled "Amazed" by Lonestar.

Figure 2C:
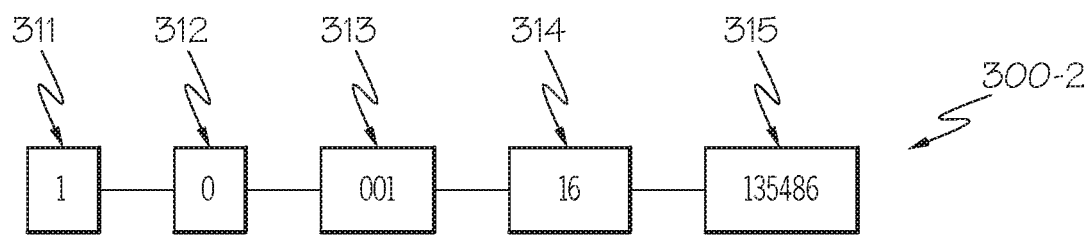
FIG. 2C schematically depicts another example event flag according to one or more embodiments shown and described herein.

As another non-limiting example and as schematically depicted in FIG. 2C, a first portion 311 of event flag 300-2, which may be a default single-digit number that categorizes the event flag 300-2 as falling within the sports category, may be a "1." A second portion 312 of the event flag 300-2, which may be a single-digit number utilized to categorize the event flag 300-2 as falling within a professional sports category (e.g., a "0"), a college sports category (e.g., a "1"), or an amateur sports category (e.g., a "2"), may be a "0." A third portion 313 of the event flag 300-2, which may be a number utilized to categorize the particular type of sport, may be a "001" (e.g., the event flag 300-2 falls within the professional American football category). In some embodiments, each particular professional sport, college sport, or amateur sport may be assigned a unique number.

Accordingly, an event flag 300-2 having the first portion 311, the second portion 312, and the third portion 313, respectively, with the values "1-0-001," as shown in FIG. 2C, may indicate that the corresponding broadcasted audio signal is a professional American football game. As another non-limiting example, an event flag 300-2 having the first portion 311, the second portion 312, and the third portion 313, respectively, with the values "1-0-003" may indicate that the corresponding broadcasted audio signal is a professional basketball game.

A fourth portion 314 of the event flag 300-2, which may be utilized to identify a particular team, may be a "16" (e.g., the event flag 300-2 is associated with the Dallas Cowboys®). In some embodiments, each team within a professional sport, college sport, or amateur sport may be assigned a unique number. Furthermore, a fifth portion 315 of the event flag 300-2, which may be utilized to identify an event associated with the identified team, may be a "135486" (e.g., the event flag 300-2 indicates that the Dallas Cowboys® and their opponent are tied entering the two-minute warning of the fourth quarter). In some embodiments, each of the various events associated with a sporting event may be assigned a unique number. Accordingly, the event flag having the value "1-0-001-16-135486," as schematically depicted in FIG. 2C, may indicate that the broadcasted audio signal corresponds to the Dallas Cowboys® and their opponent being tied and entering the two-minute warning of the fourth quarter.

Figure 2D:
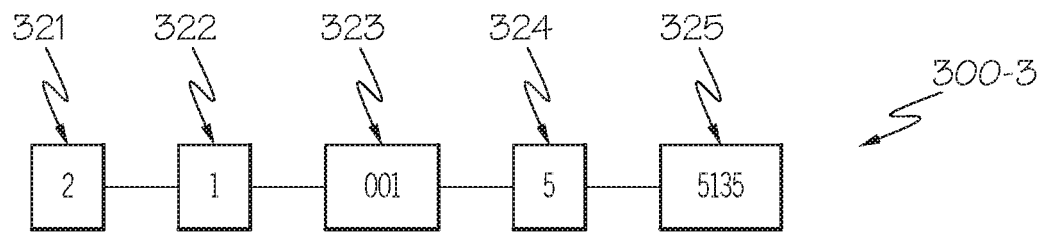
FIG. 2D schematically depicts yet another example event flag according to one or more embodiments shown and described herein.

As another non-limiting example and as schematically depicted in FIG. 2D, a first portion 321 of event flag 300-3, which may be a default single-digit number that categorizes the event flag 300-3 as falling within the news category, may be a "2." A second portion 322 of the event flag 300-3, which may be a single-digit number utilized to categorize the event flag 300-3 as falling within an international news category (e.g., a "0"), a national news category (e.g., a "1"), or a regional news category (e.g., a "2"), may be a "1." A third portion 323 of the event flag 300-3, which may be a number utilized to categorize the particular type of news category, may be a "001" (e.g., the event flag 300-3 falls within the weather news category). In some embodiments, each particular type of news category may be assigned a unique number.

Accordingly, an event flag 300-3 having the first portion 321, the second portion 322, and the third portion 323, respectively, with the values "2-1-001," as shown in FIG. 2C, may indicate that the corresponding broadcasted audio signal is a national weather news broadcast. As another non-limiting example, an event flag 300-3 having the first portion 321, the second portion 322, and the third portion 323, respectively, with the values "2-2-002" may indicate that the corresponding broadcasted audio signal is a regional traffic news broadcast.

A fourth portion 324 of the event flag 300-3, which may be utilized to identify a particular radio station, may be a "5" (e.g., the event flag 300-3 is associated with news station AM channel 950 kHz). In some embodiments, each radio station within a particular news type may be assigned a unique number. Furthermore, a fifth portion 325 of the event flag 300-3, which may be utilized to identify an event associated with radio station, may be a "5135" (e.g., the event flag 300-3 indicates that it is breaking news corresponding to an earthquake in California). In some embodiments, each of the various events associated with the news type and news station may be assigned a unique number. Accordingly, the event flag having the value "2-1-001-5-5135," as schematically depicted in FIG. 2D, may indicate that AM channel 950 kHz is broadcasting a breaking news alert corresponding to an earthquake in California.

While the above embodiments illustrate each event flag 300 having five portions with numeric representations, the embodiments described in FIGS. 2B-2D are merely illustrative examples of an event flag 300. Thus, it should be understood that in other embodiments, the event flag 300 may have any number of portions and/or characters (e.g., letter, number, space, punctuation mark, symbol, or the like) used to categorize the corresponding broadcasted audio signal.

Referring now to FIG. 2A, in response to receiving the event flags 300 from the radio station computing devices 30, the routing and filtering module 205 may be configured to discard certain event flags 300 based on the entries of the corresponding user profile stored within the user profile database 230. As a non-limiting example, if the user's profile indicates preference characteristics that are only associated with sports audio broadcasts, the routing and filtering module 205 may discard all event flags 300 that do not have a first portion (e.g., first portion 301, 311, 321) categorizing the event flag 300 as being in the sports category.

In some embodiments, the routing and filtering module 205 may be configured to route the remaining event flags 300 to the corresponding category modules 210. As a non-limiting example, the routing and filtering module 205 may provide event flags 300 associated with sports audio broadcasts to a first category module 210-1 and event flags 300 associated with music audio broadcasts to a second category module 210-2. Assigning each of the category modules 210 to a respective audio broadcast category may improve the efficiency and accuracy of the event flag comparison process when each category has a unique combination, type, and/or number of characters used to define the event flag 300.

The category modules 210 are configured to compare the event flag 300 to the preference characteristics of the user's profile stored within the user profile database 230. In some embodiments, the preference characteristics are defined by the corresponding user. As a non-limiting example, the user profile may define various preference characteristics using a software application executing on a mobile device, such as a laptop, smartphone, PDA, or the like (not shown). As such, the mobile device may be configured to communicate the preference characteristics to the remote computing device 70 via the network 80, and subsequently, the remote computing device 70 may define and/or update the user's profile stored within the user profile database 230 based on the received preference characteristics. Moreover, the remote computing device 70 may define the preference characteristics such that the format is consistent with the event flag 300 format. As a non-limiting example, if the user defines a preference characteristic as preferring to tune into Dallas Cowboys® games when the game is close and is within the last two minutes of the game, the remote computing device 70 may generate an entry with the value "1-0-003-16-135486," which is identical to the event flag 300-2 illustrated in FIG. 2C, and then associate the entry with the user's profile.

The category modules 210 are also configured to determine a degree of matching between the event flags 300 and the preference characteristics based on the comparison of the event flags 300 to the preference characteristics of the user's profile. As a non-limiting example, in response to the first category module 210-1 receiving the event flag 300 having the value "1-0-003-16-135486" (e.g., the broadcasted audio signal indicates that the Dallas Cowboys® and their opponent are tied entering into the two-minute warning of the fourth quarter), the first category module 210-1 may identify entries associated with the user's profile and determine whether any of the entries include the value "1-0-003-16-135486" (i.e., whether the user has defined one of his/her preference characteristics as tuning into Dallas Cowboys® games when the game is close and is within the last two minutes of the game). If the first category module 210-1 locates an entry with the corresponding value, the first category module 210-1 may determine that the degree of matching is 100%.

Alternatively, if the first category module 210-1 locates an entry that is similar to the corresponding value, such as "1-0-003-16-135286" (e.g., the user has defined one of his/her preference characteristics as tuning into Dallas Cowboys® games when the game is close and is within the last five minutes of the game) the first category module 210-1 may determine that the degree of matching is 96%, as it completely matches the first, second, third, and fourth portions of the event flag 300, and it matches five out of six digits of the fifth portion.

As another alternative, if the first category module 210-1 locates an entry that is similar to the corresponding value, such as "1-0-003-21-135486" (e.g., the user has defined one of his/her preference characteristics as tuning into Detroit Lions® games when the game is close and is within the last two minutes of the game), the first category module 210-1 may determine that the degree of matching is 80%, as it completely matches the first, second, fourth, and fifth portions of the event flag 300, but it does not match the third portion of the event flag 300. In other embodiments, the first category module 210-1 may determine that the degree of matching is 60% in this instance, as the first category module 210-1 may determine a portion of the event flag 300 matches only if all preceding portions of the event flag 300 also match.

As another non-limiting example, in response to the second category module 210-2 receiving the event flag 300 having the value "0-1-200-1234567-5689" (e.g., the broadcasted audio signal corresponds to the song titled "Amazed" by Lonestar), the second category module 210-2 may identify entries associated with the user's profile and determine whether any of the entries include the value "0-1-200-1234567-5689" (i.e., whether the user has defined one of his/her preference characteristics as tuning into a radio station playing the song titled "Amazed" by Lonestar). If the second category module 210-2 locates an entry with the corresponding value, the second category module 210-2 may determine that the degree of matching is 100%.

Alternatively, if the second category module 210-2 locates an entry that is similar to the corresponding value, such as "0-1-200-1234567-5695" (e.g., the user has defined one of his/her preference characteristics as tuning into a radio station playing the song titled "No News" by Lonestar) the second category module 210-2 may determine that the degree of matching is 80% in this instance, as it completely matches the first, second, third, and fourth portions of the event flag 300, but does not completely match the fifth portion of the event flag 300.

As another alternative, if the second category module 210-2 locates an entry that is similar to the corresponding value, such as "0-1-200-2486587-5695" (e.g., the user has defined one of his/her preference characteristics as tuning into a radio station playing the song titled "Before He Cheats" by Carrie Underwood), the second category module 210-2 may determine that the degree of matching is 60% in this instance, as it completely matches the first, second, and third, of the event flag 300, but does not completely match the fourth and fifth portions of the event flag 300.

It should be understood that the event flags 300 and the above embodiments describing the degree of matching are non-limiting examples, and that other manners of matching the event flags 300 to the preference characteristics in the user's profile may be utilized in other embodiments.

In some embodiments, the degree of matching may be adjusted by entries in a sponsor database 235. As a non-limiting example, an entry in the sponsor database 235 with a value of "1-0-003-16-000000" (e.g., all Dallas Cowboys® event flags) may cause the first category module 210-1 to boost all degrees of matching associated with Dallas Cowboys® event flags by a first value, such as 10%. It should be understood that other adjustment values and/or adjustment rules may also be implemented in other embodiments.

In some embodiments, the degree of matching may be adjusted by the location module 215. As a non-limiting example, the location module 215 may obtain location information from a global navigation satellite system (GNSS) sensor 240 of the vehicle 20, such as a global positioning system (GPS) sensor, via the network 80. As a non-limiting example, if the GNSS sensor 240 indicates that the vehicle 20 is in Dallas, Tex., the first category module 210-1 may boost all degrees of matching associated with Dallas Cowboys® event flags and both news and music radio station event flags with radio coverage in Dallas, Tex. by a first value, such as 5%. It should be understood that other adjustment values and/or adjustment rules may also be implemented in other embodiments.

The degree of matching associated with each of the event flags 300 is provided to an event flag selector module 245 of the remote computing device 70. In response to receiving the degree of matching associated with each of the event flags 300, the event flag selector module 245 is configured to determine whether a set of the event flags 300 of the plurality of event flags 300 matches a set of the preference characteristics of the user's profile. As a non-limiting example, the event flag selector module 245 may determine that the set of event flags 300 matches a set of preference characteristics of the user's profile if each event flag of the set of event flags 300 has a degree of matching that is greater than or equal to a threshold degree of matching, such as 95%, 90%, 85%, etc.

In some embodiments, if only one event flag is in the set of event flags 300, then the event flag selector module 245 transmits a notification signal to a notification module 260 of the vehicle 20, wherein the notification signal includes information associated with the one event flag and the corresponding broadcasted audio signal. In some embodiments, the notification signal may be transmitted via the network 80.

In other embodiments where two or more event flags are in the set of event flags 300, the event flag selector module 245 is configured to select a first event flag from the set of event flags 300. As a non-limiting example, the first event flag may have the highest degree of matching within the set of event flags 300. Accordingly, the event flag selector module 245 may subsequently transmit the notification signal to the notification module 260 of the vehicle 20, wherein the notification signal includes information associated with the first event flag and the corresponding broadcasted audio signal.

In some embodiments, the notification signal may be transmitted when an audio status module 220 indicates that the user is not currently tuned into the corresponding broadcasted audio signal. As a non-limiting example, the audio status module 220 may obtain radio system information of a radio system 265 of the vehicle 20, which may include information representing a selected audio signal according to tuning control module 270. The audio status module 220 may obtain radio system information of the radio system 265 via the network 80 or using other suitable wireless communication protocols, such as an LTE communication protocol or other cellular data communication protocol. If the corresponding broadcasted audio signal does not match the selected audio signal, the event flag selector module 245 may transmit the notification signal; otherwise, the event flag selector module 245 may refrain from transmitting the notification signal, as described below in further detail.

Figure 3:
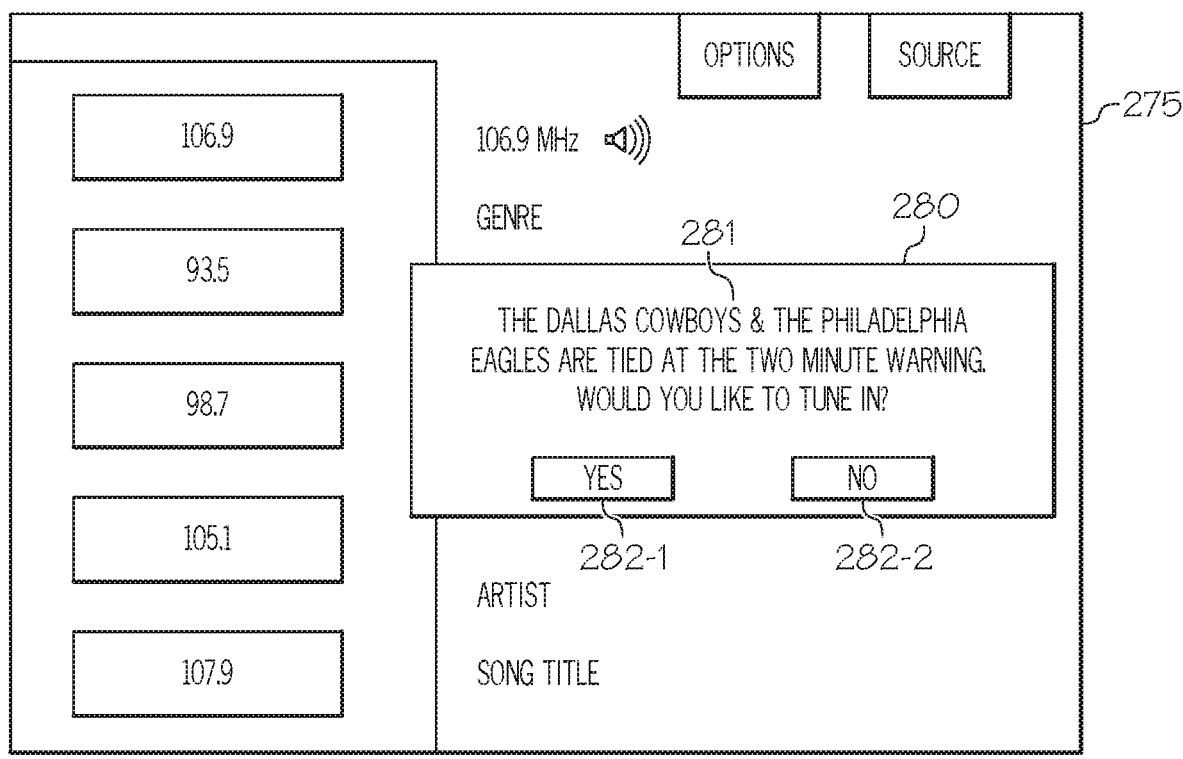
FIG. 3 schematically depicts an example graphical user interface of a vehicle display of an example radio broadcasting system according to one or more embodiments shown and described herein.

In response to receiving the notification signal, the notification module 260 may generate a signal that causes a display 275 to generate GUI element 280 associated with the selected event flag and the corresponding broadcasted audio signal. As a non-limiting example and as illustrated in FIG. 3, GUI element 280-1 may include text 281, a first button 282-1, and a second button 282-2 (collectively referred to as buttons 282). The text 281 may represent the selected event flag (i.e., the Dallas Cowboys® game is tied and is within the last two minutes of the game). In response to selecting the first button 282-1 (i.e., "Yes" button), the tuning control module 270 may tune the radio system 265 to switch from the selected audio signal (FM Channel 106.9 MHz) to the unselected audio signal corresponding to the selected event flag (the Dallas Cowboys® game on another FM channel, AM channel, or Satellite radio channel). In response to selecting the second button 282-2 (i.e., "No" button), the selected audio signal is not switched to the unselected audio signal. In other embodiments, the GUI element 280-1 may include text and/or other graphics representing the selected event flag and indicating that the radio system 265 is automatically being tuned to the unselected audio signal corresponding to the selected event flag.

Figure 4:
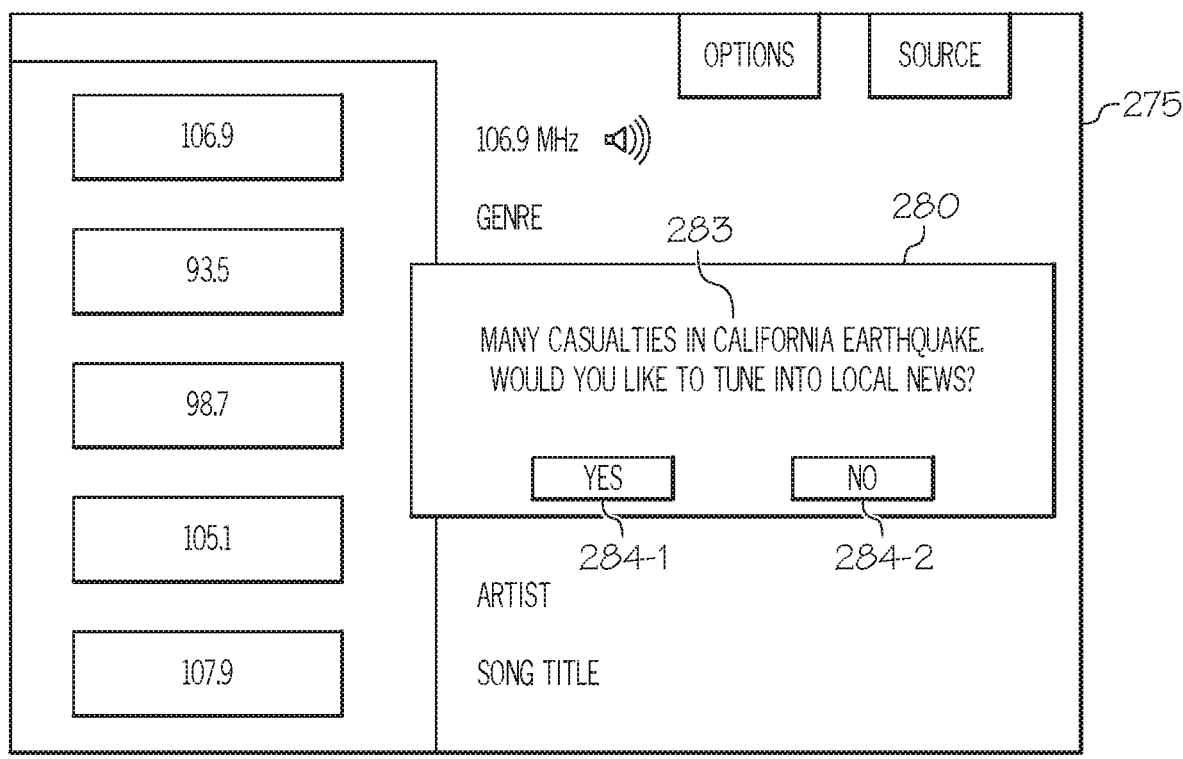
FIG. 4 schematically depicts another example graphical user interface of a vehicle display of an example radio broadcasting system according to one or more embodiments shown and described herein.

As another non-limiting example and as illustrated in FIG. 4, GUI element 280-2 may include text 283, a first button 284-1, and a second button 284-2 (collectively referred to as buttons 284). The text 283 may represent the selected event flag (i.e., a breaking news alert corresponding to an earthquake in California). In response to selecting the first button 284-1 (i.e., "Yes" button), the tuning control module 270 may tune the radio system 265 to switch from the selected audio signal (FM Channel 106.9 MHz) to the unselected audio signal corresponding to the selected event flag (a news station on another FM channel, AM channel, or Satellite radio channel). In response to selecting the second button 284-2 (i.e., "No" button), the selected audio signal is not switched to the unselected audio signal. In other embodiments, the GUI element 280-2 may include text and/or other graphics representing the selected event flag and indicating that the radio system 265 is automatically being tuned to the unselected audio signal corresponding to the selected event flag.

Figure 5:
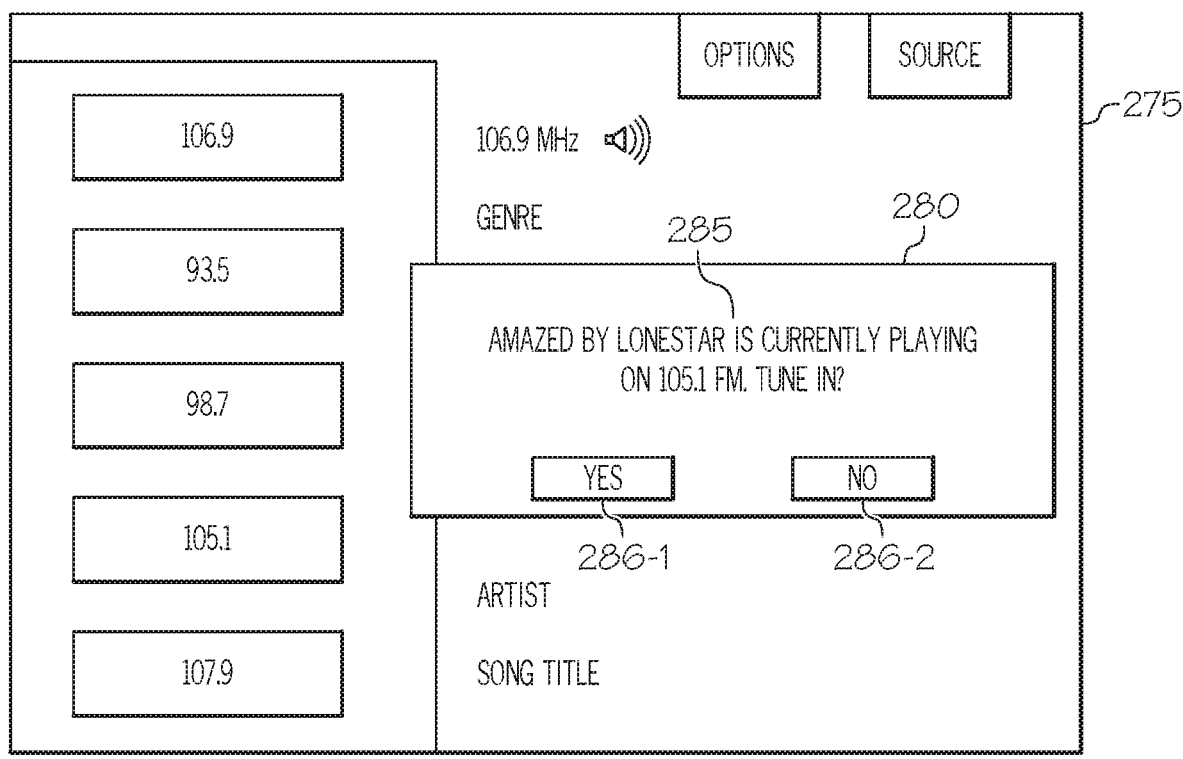
FIG. 5 schematically depicts yet another an example graphical user interface of a vehicle display of an example radio broadcasting system according to one or more embodiments shown and described herein.

As another non-limiting example and as illustrated in FIG. 5, GUI element 280-3 may include text 285, a first button 286-1, and a second button 286-2 (collectively referred to as buttons 286). The text 285 may represent the selected event flag (i.e., a music station playing the song titled "Amazed" by Lonestar). In response to selecting the first button 286-1 (i.e., "Yes" button), the tuning control module 270 may tune the radio system 265 to switch from the selected audio signal (FM Channel 106.9 MHz) to the unselected audio signal corresponding to the selected event flag (the music station on another FM channel, AM channel, or Satellite radio channel). In response to selecting the second button 286-2 (i.e., "No" button), the selected audio signal is not switched to the unselected audio signal. In other embodiments, the GUI element 280-3 may include text and/or other graphics representing the selected event flag and indicating that the radio system 265 is automatically being tuned to the unselected audio signal corresponding to the selected event flag.

In some embodiments, a feedback module 225 of the remote computing device 70 (illustrated in FIG. 2A) may receive information corresponding to a selection of one of the buttons 282, 284, 286 illustrated in FIGS. 3-5, respectively. Accordingly, the feedback module 225 may update the user's profile within the user profile database 230 based on the selection. As a non-limiting example, if the feedback module 225 receives selection information indicating that the user has not changed the selected audio signal to an unselected audio signal playing the song titled "Amazed" by Lonestar (i.e., the second button 286-2 in FIG. 5 has been selected numerous instances and/or has been selected more than a threshold number of instances), then the feedback module 225 may delete the corresponding entry from the user's profile. It should be understood that other updating and/or entry modification techniques may also be implemented in other embodiments.

In some embodiments, the audio status module 220 continues to obtain radio system information of the radio system 265 of the vehicle 20 when the radio system 265 is switched from the selected audio signal (e.g., FM Channel 106.9 MHz in FIG. 3) to the unselected audio signal associated with the selected event flag (the Dallas Cowboys® game on another FM channel, AM channel, or Satellite radio channel in FIG. 3). As a non-limiting example, if the Dallas Cowboys® score a touchdown or field goal, and the game is no longer considered tied within the last two minutes of the game, the corresponding event flag value may be updated to a new value (e.g., "1-0-003-16-345167"). Accordingly, the new value of the corresponding event flag may be compared to a set of preference characteristics in the user's profile to determine an updated degree of matching. If the updated degree of matching is no longer greater than or equal to the threshold degree of matching, the tuning control module 270 may automatically tune the radio system 265 such that it reverts back to the original, selected audio signal (e.g., FM Channel 106.9 MHz in FIG. 3).

Figure 6A:
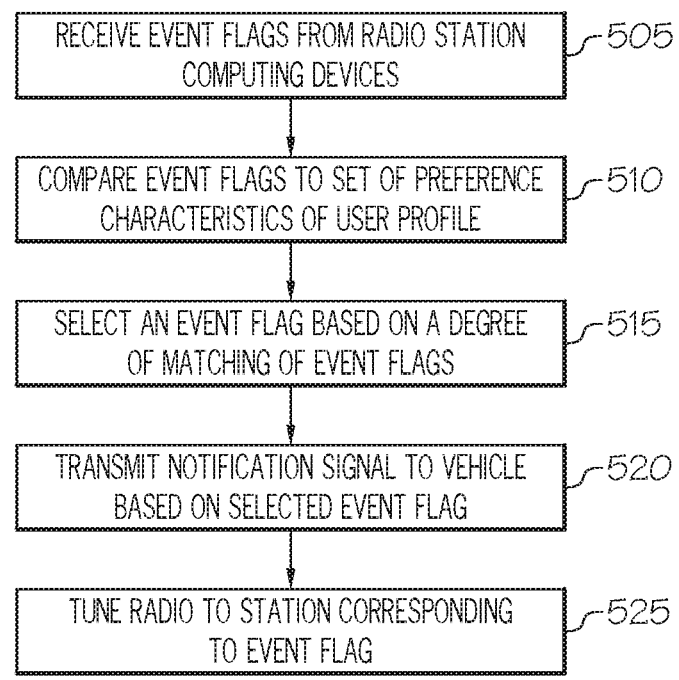
FIG. 6A depicts a flow diagram of an illustrative method for generating a graphical user interface element that enables an operator of a vehicle to select a radio channel according to one or more embodiments shown and described herein.

Referring now to FIG. 6A, a flow diagram of an illustrative method for generating the graphical user interface that enables an operator of a vehicle to select a radio channel is schematically depicted. At step 505, the remote computing device 70 receives the event flags 300 from the radio station computing devices 30. At step 510, the category modules 210 of the remote computing device 70 compare the event flags 300 to the set of preference characteristics associated with the user's profile. At step 515, the event flag selector module 245 of the remote computing device 70 selects an event flag from the event flags 300 based on a degree of matching, as described above.

At 520, the event flag selector module 245 of the remote computing device 70 transmits the notification signal to the notification module 260 of the vehicle 20 via the network 80. At step 525, the radio system 265 is tuned, either automatically or in response to a user interaction with the GUI element associated with the notification signal, to the unselected broadcasted audio signal corresponding to the selected event flag.

Figure 6B:
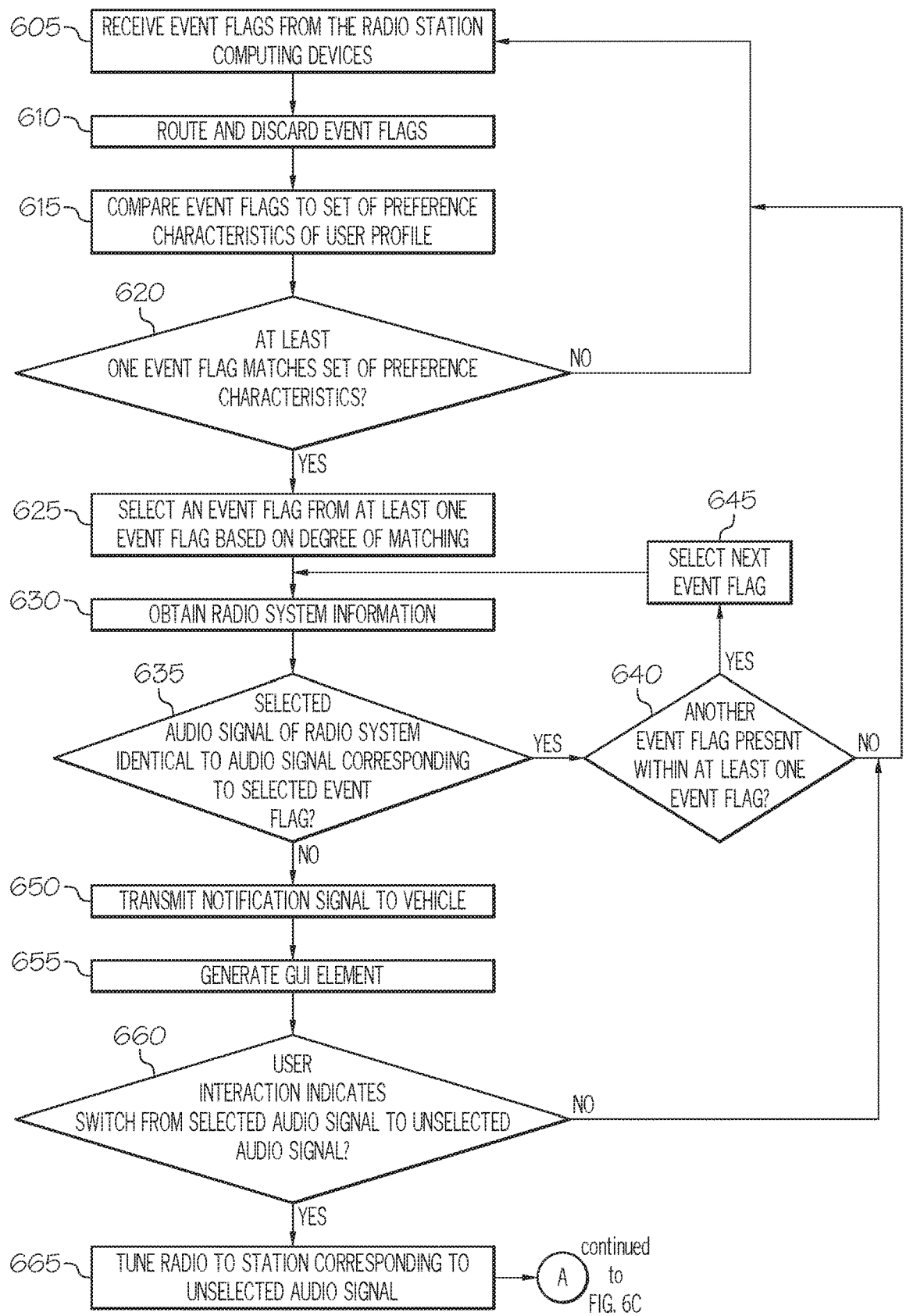
FIGS. 6B-6C depict a flow diagram of another illustrative method for generating a graphical user interface element that enables an operator of a vehicle to select a radio channel according to one or more embodiments shown and described herein.
Figure 6C:
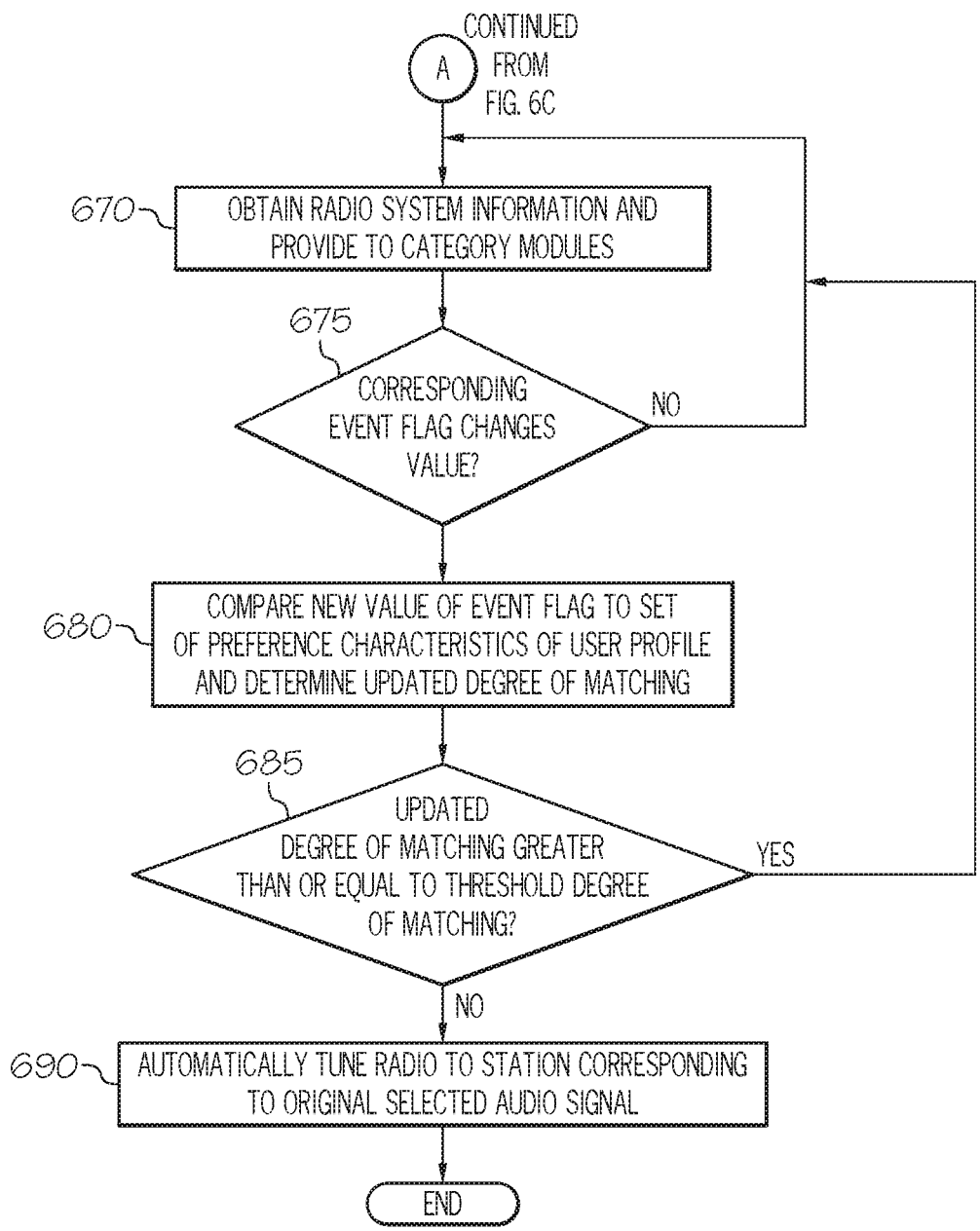

Referring now to FIGS. 6B-6C, a flow diagram of another illustrative method for generating a graphical user interface element that enables an operator of a vehicle to select a radio channel is schematically depicted. At step 605, the remote computing device 70 receives the event flags 300 from the radio station computing devices 30. At step 610, the routing and filtering module 205 of the remote computing device 70 discards certain event flags 300 based on the preference characteristics of the user's profile. Furthermore, at step 610, the routing and filtering module 205 routes the remaining event flags 300 to the corresponding category modules 210 based on, for example, the first portion of the event flags 300, as described above with reference to FIGS. 2B-2D.

At step 615, the category modules 210 of the remote computing device 70 compare the event flags 300 to the set of preference characteristics associated with the user's profile. At step 620, the category modules 210 of the remote computing device 70 determine whether at least one event flag of the event flags 300 matches the set of preference characteristics associated with the user's profile. If so, the flow diagram proceeds to step 625; otherwise, the flow diagram returns to step 605.

At step 625, the event flag selector module 245 of the remote computing device 70 selects an event flag from the at least one event flag based on a degree of matching. At step 630, the audio status module 220 obtains radio system information of the radio system 265 of the vehicle 20, which may include information representing a selected audio signal of the radio system 265.

At step 635, the event flag selector module 245 determines whether the broadcasted audio signal corresponding to the selected event flag is identical to the selected audio signal of the radio system 265. If so, the flow diagram proceeds to step 640, wherein the remote computing device 70 determines whether another event flag is present within the one or more event flags. If so, the flow diagram proceeds to step 645, wherein the next event flag of the at least one event flag is selected based on the degree of matching and then returns to step 630; otherwise, the flow diagram returns to 605.

If the broadcasted audio signal corresponding to the selected event flag is not identical to the selected audio signal of the radio system 265 at step 635, the flow diagram proceeds to 650. At 650, the event flag selector module 245 of the remote computing device 70 transmits the notification signal to the notification module 260 of the vehicle 20 via the network 80. At step 655, the notification module 260 generates a signal that causes the display 275 to generate the GUI element 280 associated with the selected event flag and the unselected audio signal (e.g., FIGS. 3-5).

At step 660, the tuning control module 270 determines whether the interaction with the GUI element 280 is representative of the user intending to tune the radio system 265 from the selected audio signal (e.g., FM Channel 106.9 MHz in FIG. 3) to the unselected audio signal associated with the selected event flag (the Dallas Cowboys® game on another FM channel, AM channel, or Satellite radio channel in FIG. 3). If so, the flow diagram proceeds to step 665; otherwise, the flow diagram returns to step 605. At step 665, the radio system 265 tunes the radio from the selected audio signal of the radio system 265 to the unselected audio signal associated with the selected event flag.

At step 670, the audio status module 220 of the remote computing device 70 obtains radio system information of the radio system 265 and provides the radio system information to the category modules 210. At step 675, category modules 210 determine whether the value of the event flag of the newly selected audio signal (the Dallas Cowboys® game on another FM channel, AM channel, or Satellite radio channel in FIG. 3) changes to a new value. If the event flag value does not change, the flow diagram returns to step 670. If the event flag value changes, the flow diagram proceeds to step 680.

At step 680, the event flag value is compared to the set of preference characteristics in the user's profile to determine an updated degree of matching. At step 685, the category module 210 determines whether the updated degree of matching is greater than or equal to the threshold degree of matching. If so, the flow diagram returns to step 670; otherwise, the flow diagram proceeds to step 690, wherein the tuning control module 270 tunes the radio system 265 such that it reverts back to the original, selected audio signal (e.g., FM Channel 106.9 MHz in FIG. 3). The flow diagram then ends.

Figure 7:
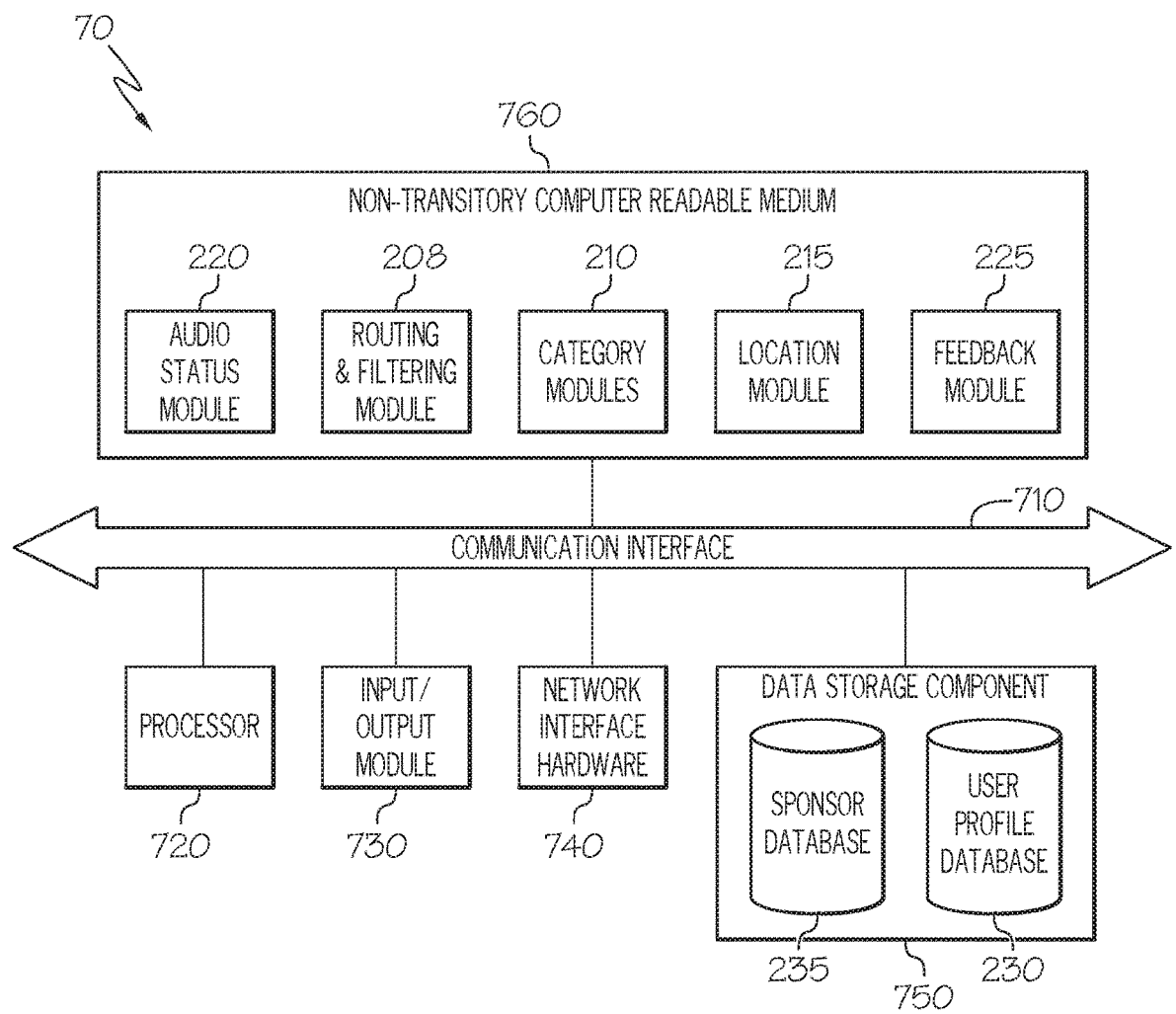
FIG. 7 schematically depicts a remote computing device of an example radio broadcasting system according to one or more embodiments shown and described herein.

With reference to FIG. 7, an example embodiment of the remote computing device 70 is schematically depicted. The remote computing device 70 generally includes a communication interface 710, a processor 720, input/output hardware 730, network interface hardware 740, a data storage component 750, and a non-transitory computer-readable medium 760. The components of the remote computing device 70 may be physically and/or communicatively coupled through the communication interface 710.

The communication interface 710 is formed from any medium that is configured to transmit a signal. As non-limiting examples, the communication interface 710 is formed of conductive wires, conductive traces, optical waveguides, or the like. The communication interface 710 may also refer to the expanse in which electromagnetic radiation and their corresponding electromagnetic waves traverses. Moreover, the communication interface 710 may be formed from a combination of mediums configured to transmit signals. In one embodiment, the communication interface 710 comprises a combination of conductive traces, conductive wires, connectors, and buses that cooperate to permit the transmission of electrical data signals to and from the various components of the remote computing device 70. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

The processor 720 may be any device of capable of executing machine-readable instructions stored in the non-transitory computer-readable medium 760. As a non-limiting example, the processor 720 may be one of a shared processor circuit, dedicated processor circuit, or group processor circuit. As described herein, the term shared processor circuit refers to a single processor circuit that executes some or all machine-readable instructions from the multiple modules (i.e., the routing and filtering module 205, the category modules 210, the location module 215, the audio status module 220, and the feedback module 225). As described herein, the term group processor circuit refers to a processor circuit that, in combination with additional processor circuits, executes some or all machine-executable instructions from the multiple modules. References to multiple processor circuits encompass multiple processor circuits on discrete dies, multiple processor circuits on a single die, multiple cores of a single processor circuit, multiple threads of a single processor circuit, or a combination of the above.

The input/output hardware 730 may refer to a basic input/output system (BIOS) that interacts with hardware of the remote computing device 70, device drivers that interact with particular devices of the remote computing device 70, one or more operating systems, user applications, background services, background applications, etc.

The network interface hardware 740 may include and/or be configured to communicate with any wired or wireless networking hardware, including an antenna, a modem, a LAN port, wireless fidelity (Wi-Fi) card, WiMax card, ZigBee card, Bluetooth chip, USB card, mobile communications hardware, and/or other hardware for communicating with other networks and/or devices.

The data storage component 750, which includes the user profile database 230 and the sponsor database 235, is communicatively coupled to the processor 720. As a non-limiting example, the data storage component 750 may include one or more database servers that support NoSQL, MySQL, Oracle, SQL Server, NewSQL, or the like.

The non-transitory computer-readable medium 760 is communicatively coupled to the processor 720. As a non-limiting example, non-transitory computer-readable medium 760 may be one of a shared memory circuit, dedicated memory circuit, or group memory circuit. As described herein, the term shared memory circuit refers to a single memory circuit that stores some or all machine-readable instructions from the multiple modules (i.e., the routing and filtering module 205, the category modules 210, the location module 215, the audio status module 220, and the feedback module 225). As described herein, the term group memory circuit refers to a memory circuit that, in combination with additional memories, stores some or all machine-readable instructions from the multiple modules.

While the remote computing device 70 is shown as an independent and a separate component of the radio broadcasting system 10-1, in some embodiments and as described below with reference to FIGS. 8-11, the remote computing device 70 may be removed. Accordingly, all of the modules and components of the remote computing device 70 may be included within the vehicle 20.

Figure 8:
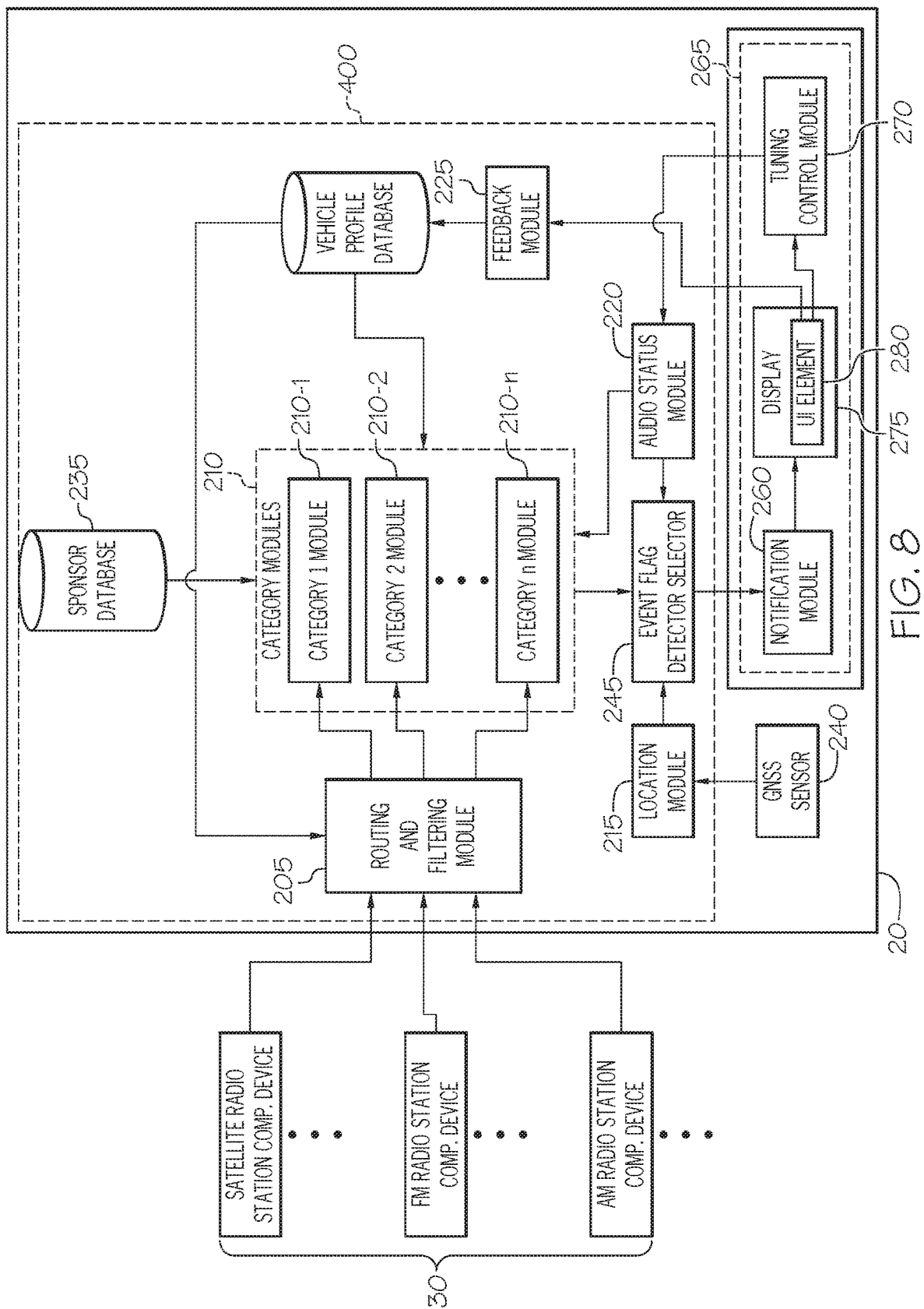
FIG. 8 schematically depicts another functional block diagram of a plurality of radio station computing devices and a vehicle of an example radio broadcasting system according to one or more embodiments shown and described herein.

Referring now to FIG. 8, an example functional block diagram of the radio station computing devices 30 and the vehicle 20 of radio broadcasting system 10-2 is schematically depicted. This illustrated embodiment is similar to the embodiments described above with reference to FIGS. 1-7, but in this embodiment, the remote computing device 70 is replaced with a vehicle control unit 400 that is integrated into the vehicle 20. Accordingly, the vehicle control unit 400 includes the routing and filtering module 205, the category modules 210, the location module 215, the audio status module 220, and the feedback module 225. Furthermore, the vehicle 20 may communicate directly receive the event flags from the radio station computing devices 30 via the network 80 in this illustrated embodiment.

Figure 9A:
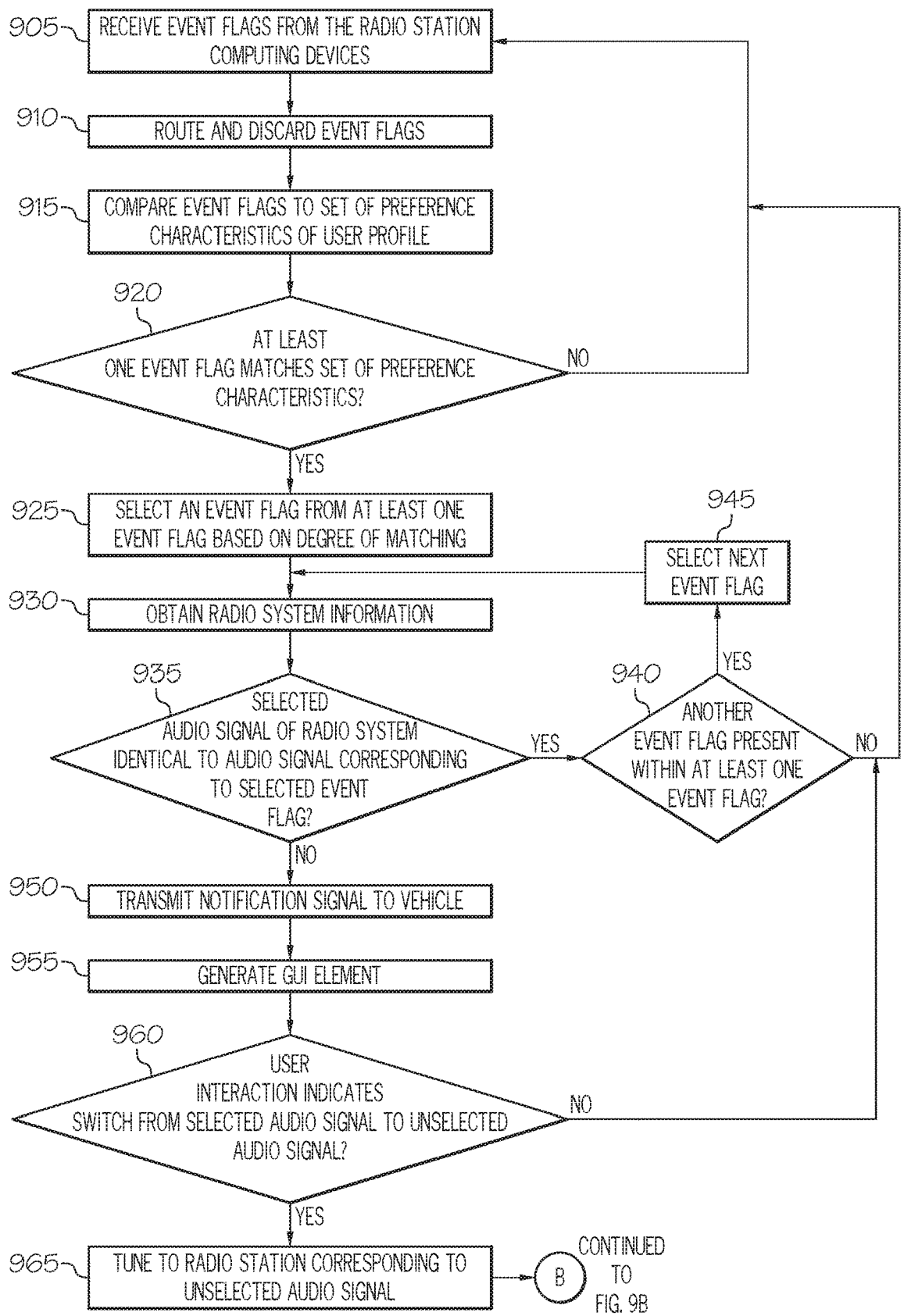
FIGS. 9A-9B depict a flow diagram of another illustrative method for generating a graphical user interface element that enables an operator of a vehicle to select a radio channel according to one or more embodiments shown and described herein.
Figure 9B:
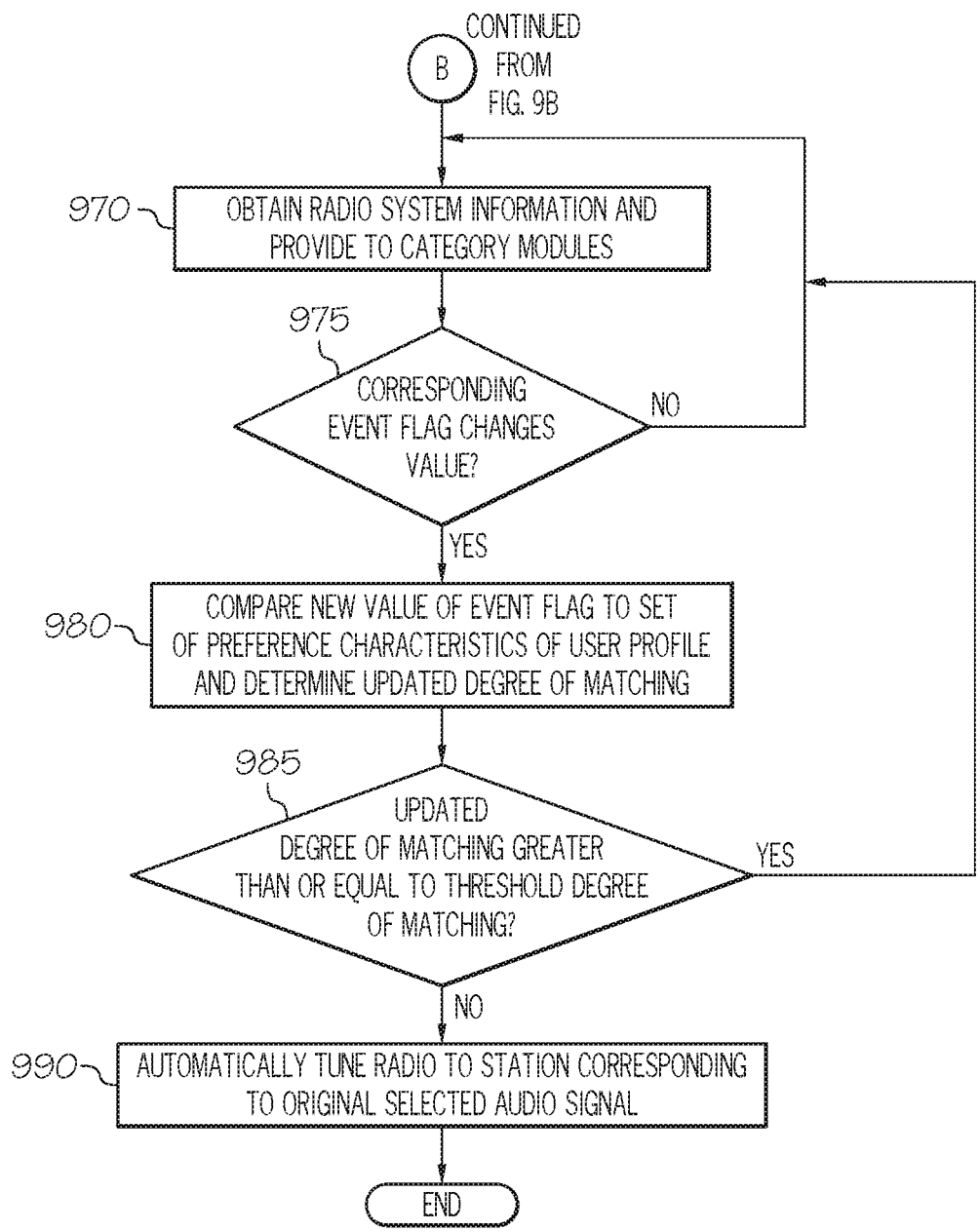

Referring now to FIGS. 9A-9B, a flow diagram of an illustrative method for generating a graphical user interface element that enables an operator of a vehicle to select a radio channel is schematically depicted. The illustrated embodiment is similar to the embodiments described above with reference to FIGS. 1-7, but in this embodiment, the remote computing device 70 is replaced with a vehicle control unit 400 that is included within the vehicle 20.

At step 905, the vehicle control unit 400 receives the event flags 300 from the radio station computing devices 30 via the network 80 or using another suitable wireless communication protocol. At step 910, the routing and filtering module 205 of the vehicle control unit 400 discards certain event flags 300 based on the preference characteristics of the user's profile. Furthermore, at step 910, the routing and filtering module 205 routes the remaining event flags 300 to the corresponding category modules 210 based on, for example, the first portion of the event flags 300, as described above with reference to FIGS. 2B-2D.

At step 915, the category modules 210 of the vehicle control unit 400 compare the event flags 300 to the set of preference characteristics associated with the user's profile. At step 920, the category modules 210 of the vehicle control unit 400 determine whether at least one event flag of the event flags 300 matches the set of preference characteristics associated with the user's profile. If so, the flow diagram proceeds to step 925; otherwise, the flow diagram returns to step 905.

At step 925, the event flag selector module 245 of the vehicle control unit 400 selects an event flag from the at least one event flag based on a degree of matching. At step 930, the audio status module 220 obtains radio system information of the radio system 265 of the vehicle 20, which may include information representing a selected audio signal of the radio system 265.

At step 935, the event flag selector module 245 determines whether the broadcasted audio signal corresponding to the selected event flag is identical to the selected audio signal of the radio system 265. If so, the flow diagram proceeds to step 940, wherein the vehicle control unit 400 determines whether another event flag is present within the one or more event flags. If so, the flow diagram proceeds to step 945, wherein the next event flag of the at least one event flag is selected based on the degree of matching and then returns to step 930; otherwise, the flow diagram returns to step 905.

If the broadcasted audio signal corresponding to the selected event flag is not identical to the selected audio signal of the radio system 265 at step 935, the flow diagram proceeds to 950. At 950, the event flag selector module 245 of the vehicle control unit 400 transmits the notification signal to the notification module 260 of the vehicle 20 via the network 80. At step 955, the notification module 260 generates a signal that causes the display 275 to generate the GUI element 280 associated with the selected event flag and the unselected audio signal (e.g., FIGS. 3-5).

At step 960, the tuning control module 270 determines whether the interaction with the GUI element 280 is representative of the user intending to tune the radio system 265 from the selected audio signal (e.g., FM Channel 106.9 MHz in FIG. 3) to the unselected audio signal associated with the selected event flag (the Dallas Cowboys® game on another FM channel, AM channel, or Satellite radio channel in FIG. 3). If so, the flow diagram proceeds to step 965; otherwise, the flow diagram returns to step 905. At step 965, the radio system 265 tunes the radio from the selected audio signal of the radio system 265 to the unselected audio signal associated with the selected event flag.

At step 970, the audio status module 220 of the vehicle control unit 400 obtains radio system information of the radio system 265 and provides the radio system information to the category modules 210. At step 975, category modules 210 determine whether the value of the event flag of the newly selected audio signal (the Dallas Cowboys® game on another FM channel, AM channel, or Satellite radio channel in FIG. 3) changes to a new value. If the event flag value does not change, the flow diagram returns to step 970. If the event flag value changes, the flow diagram proceeds to step 980.

At step 980, the event flag value is compared to the set of preference characteristics in the user's profile to determine an updated degree of matching. At step 985, the category module 210 determines whether the updated degree of matching is greater than or equal to the threshold degree of matching. If so, the flow diagram returns to step 970; otherwise, the flow diagram proceeds to step 990, wherein the tuning control module 270 tunes the radio system 265 such that it reverts back to the original, selected audio signal (e.g., FM Channel 106.9 MHz in FIG. 3). The flow diagram then ends.

Figure 10:
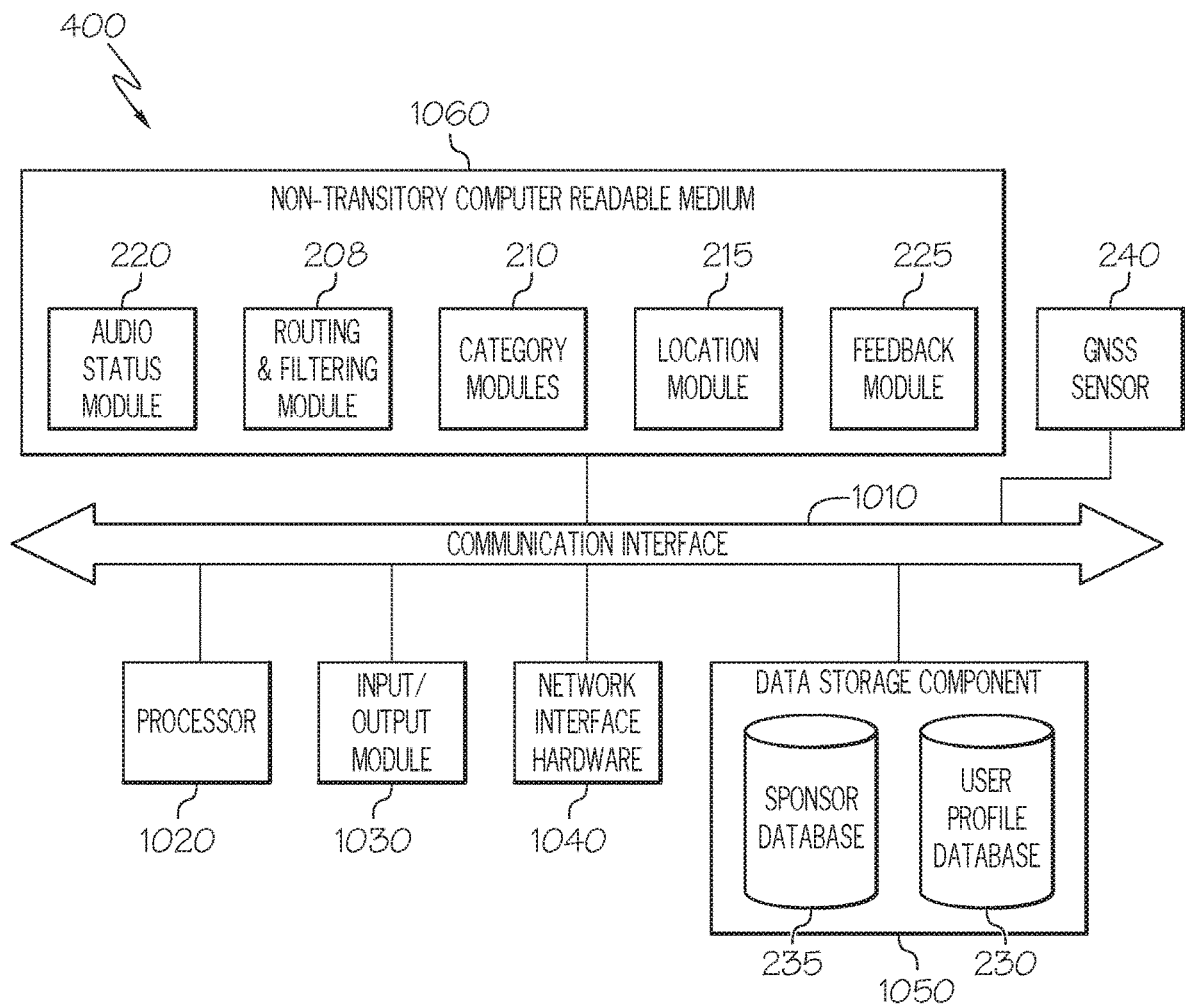
FIG. 10 schematically depicts a vehicle control unit of an example radio broadcasting system according to one or more embodiments shown and described herein.

With reference to FIG. 10, an example embodiment of the vehicle control unit is schematically depicted. The vehicle control unit generally includes a communication interface 1010, a processor 1020, input/output hardware 1030, network interface hardware 1040, a data storage component 1050, a non-transitory computer-readable medium 1060, and the GNSS sensor 240. The components of the vehicle control unit 400 may be physically and/or communicatively coupled through the communication interface 1010.

The communication interface 1010 is formed from any medium that is configured to transmit a signal. As non-limiting examples, the communication interface 1010 is formed of conductive wires, conductive traces, optical waveguides, or the like. The communication interface 1010 may also refer to the expanse in which electromagnetic radiation and their corresponding electromagnetic waves traverses. Moreover, the communication interface 1010 may be formed from a combination of mediums configured to transmit signals. In one embodiment, the communication interface 1010 comprises a combination of conductive traces, conductive wires, connectors, and buses that cooperate to permit the transmission of electrical data signals to and from the various components of the vehicle control unit 400, such as the GNSS sensor 240.

The processor 1020 may be any device of capable of executing machine-readable instructions stored in the non-transitory computer-readable medium 1060. As a non-limiting example, the processor 1020 may be one of a shared processor circuit, dedicated processor circuit, or group processor circuit.

The input/output hardware 1030 may refer to a basic input/output system (BIOS) that interacts with hardware of the vehicle control unit 400, device drivers that interact with particular devices of the vehicle control unit 400, one or more operating systems, user applications, background services, background applications, etc.

The network interface hardware 1040 may include and/or be configured to communicate with any wired or wireless networking hardware, including an antenna, a modem, a LAN port, wireless fidelity (Wi-Fi) card, WiMax card, ZigBee card, Bluetooth chip, USB card, mobile communications hardware, and/or other hardware for communicating with other networks and/or devices.

The data storage component 1050, which includes the user profile database 230 and the sponsor database 235, is communicatively coupled to the processor 1020. As a non-limiting example, the data storage component 1050 may include one or more database servers that support NoSQL, MySQL, Oracle, SQL Server, NewSQL, or the like.

The non-transitory computer-readable medium 1060 is communicatively coupled to the processor 1020. In some embodiments, the non-transitory computer-readable medium 1060 may be one of a shared memory circuit, dedicated memory circuit, or group memory circuit. Furthermore, the term memory circuit is a subset of the term computer-readable medium. Non-limiting examples of the non-transitory computer-readable medium 1060 are non-volatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

Figure 11:
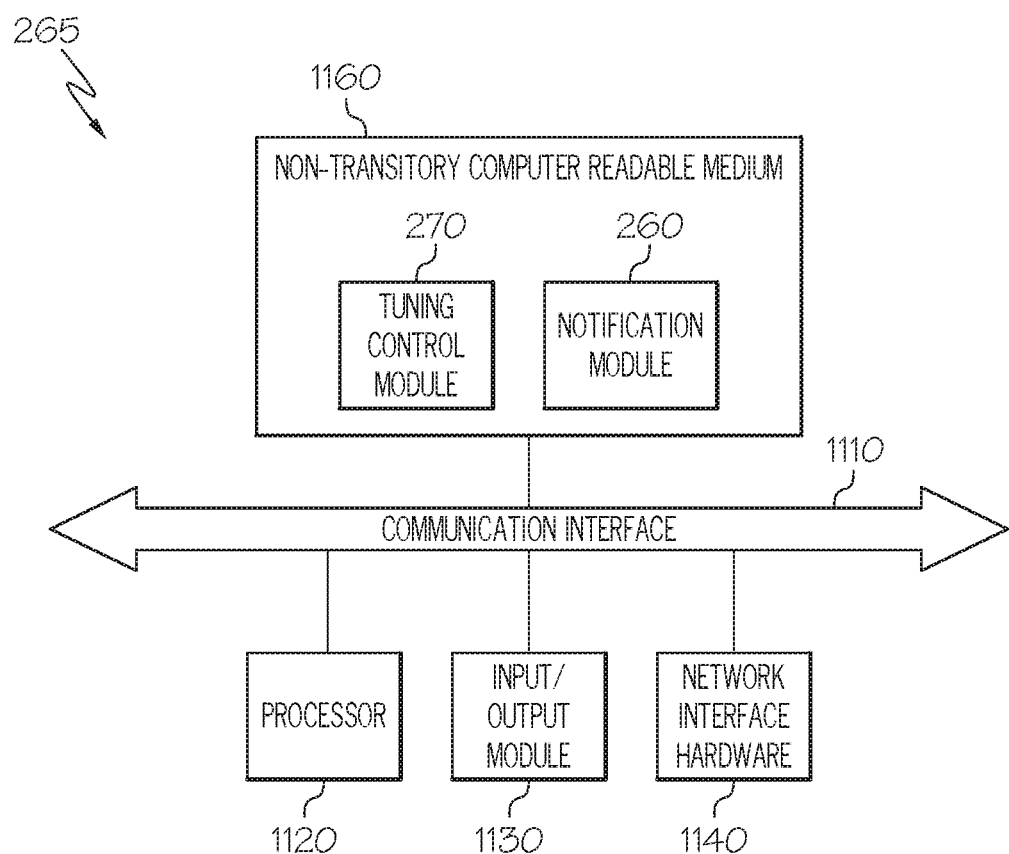
FIG. 11 schematically depicts a radio system of an example radio broadcasting system according to one or more embodiments shown and described herein.

Referring now to FIG. 11, an example embodiment of the radio system 265 is schematically depicted. The radio system 265 generally includes a communication interface 1110, a processor 1120, input/output hardware 1130, network interface hardware 1140, and a non-transitory computer-readable medium 1160. The components of the radio system 265 may be physically and/or communicatively coupled through the communication interface 1110.

The communication interface 1110 is formed from any medium that is configured to transmit a signal. As non-limiting examples, the communication interface 1110 is formed of conductive wires, conductive traces, optical waveguides, or the like. The communication interface 1110 may also refer to the expanse in which electromagnetic radiation and their corresponding electromagnetic waves traverses. Moreover, the communication interface 1110 may be formed from a combination of mediums configured to transmit signals. In one embodiment, the communication interface 1110 comprises a combination of conductive traces, conductive wires, connectors, and buses that cooperate to permit the transmission of electrical data signals to and from the various components of the radio system 265.

The processor 1120 may be any device of capable of executing machine-readable instructions stored in the non-transitory computer-readable medium 1160. As a non-limiting example, the processor 1120 may be one of a shared processor circuit, dedicated processor circuit, or group processor circuit.

The input/output hardware 1130 may refer to a basic input/output system (BIOS) that interacts with hardware of the radio system 265, device drivers that interact with particular devices of the radio system 265, one or more operating systems, user applications, background services, background applications, etc.

The network interface hardware 1140 may include and/or be configured to communicate with any wired or wireless networking hardware, including an antenna, a modem, a LAN port, wireless fidelity (Wi-Fi) card, WiMax card, ZigBee card, Bluetooth chip, USB card, mobile communications hardware, and/or other hardware for communicating with other networks and/or devices.

The non-transitory computer-readable medium 1160 is communicatively coupled to the processor 1120. In some embodiments, the non-transitory computer-readable medium 1160 may be one of a shared memory circuit, dedicated memory circuit, or group memory circuit. Furthermore, the term memory circuit is a subset of the term computer-readable medium. Non-limiting examples of the non-transitory computer-readable medium 1160 are non-volatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

It should now be understood that embodiments of the present disclosure are directed to radio broadcasting systems 10 that automatically switches a channel of the radio system 265 when an event flag associated with an unselected audio channel corresponds to a preference characteristic of a user profile allows a user to selectively listen to desired radio broadcasts without manually adjusting a tuner of a radio system. Accordingly, the user experience with the radio system 265 may be enhanced.

In addition, a radio broadcasting system 10 that automatically switches a channel of the radio system 265 when an event flag associated with an unselected audio channel corresponds to a preference characteristic of a user profile allows a user to direct less attention to finding a desired audio broadcast and more attention to the driving environment. Therefore, the radio broadcasting system 10 may improve the safety of a roadway and reduce the likelihood of vehicular collisions resulting from, for example, distracted driving.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A computing device comprising:
   one or more processors;
   one or more databases; and
   one or more non-transitory memory modules communicatively coupled to the one or more processors and storing machine-readable instructions that, when executed, cause the one or more processors to perform at least the following:
   receive a plurality of event flags, wherein each event flag of the plurality of event flags is associated with a respective broadcasted audio signal of a plurality of broadcasted audio signals;

compare the plurality of event flags to a user profile stored within the one or more databases, wherein the user profile comprises preference characteristics associated with a user;

determine whether one or more event flags of the plurality of event flags matches a set of preference characteristics of the user profile, wherein the plurality of event flags comprises at least two event flags;

select a first event flag of the set of event flags based on a degree of matching between the set of event flags and the set of preference characteristics of the user profile in response to determining that the set of event flags matches the set of preference characteristics of the user profile;

identify a first broadcasted audio signal associated with the first event flag; and transmit a notification signal to a vehicle in response to the one or more event flags matching the set of preference characteristics of the user profile.

2. The computing device of claim 1, wherein the notification signal is configured to cause the vehicle to generate a notification based on the one or more event flags.

3. The computing device of claim 1, wherein the notification signal causes the vehicle to generate a notification based on the first broadcasted audio signal.

4. The computing device of claim 1, wherein the machine-readable instructions further cause the one or more processors to:

receive radio system information from the vehicle, wherein the radio system information indicates a selected audio signal;

determine whether the radio system information matches the first broadcasted audio signal; and transmit the notification signal to the vehicle in response to the first broadcasted audio signal not matching the radio system information.

5. The computing device of claim 1, wherein the preference characteristics indicate a radio genre and an event associated with the radio genre.

6. The computing device of claim 5, wherein the radio genre is one of a news category, a sports category, and a music category.

7. A method comprising:

receiving a plurality of event flags, wherein each event flag of the plurality of event flags is associated with a respective broadcasted audio signal of a plurality of broadcasted audio signals;

comparing the plurality of event flags to a user profile stored within one or more databases, wherein the user profile comprises preference characteristics associated with a user;

determining whether one or more event flags of the plurality of event flags matches a set of preference characteristics of the user profile, wherein the set of event flags comprises at least two event flags;

selecting a first event flag of the set of event flags based on a degree of matching between the set of event flags and the set of preference characteristics of the user profile in response to determining that the set of event flags matches the set of preference characteristics of the user profile;

identifying a first broadcasted audio signal associated with the first event flag; and transmitting a notification signal to a vehicle in response to the one or more event flags matching the set of preference characteristics of the user profile.

8. The method of claim 7, wherein the notification signal is configured to cause the vehicle to generate a notification based on the one or more event flags.

9. The method of claim 7, wherein the notification signal causes the vehicle to generate a notification based on the first broadcasted audio signal.

10. The method of claim 7, further comprising:

receiving radio system information from the vehicle, wherein the radio system information indicates a selected audio signal;

determining whether the radio system information matches the first broadcasted audio signal; and transmitting the notification signal to the vehicle in response to the first broadcasted audio signal not matching the radio system information.

11. The method of claim 7, wherein the preference characteristics indicate a radio genre and an event associated with the radio genre.

12. The vehicle of claim 11, wherein the radio genre is one of a news category, a sports category, and a music category.

13. A vehicle comprising:

a radio system configured to receive a plurality of broadcasted audio signals, wherein the plurality of broadcasted audio signals comprises a selected audio signal and one or more unselected audio signals;

one or more processors;

one or more databases; and one or more non-transitory memory modules communicatively coupled to the one or more processors and storing machine-readable instructions that, when executed, cause the one or more processors to perform at least the following:

compare one or more event flags to a user profile of the one or more databases, wherein:

each event flag of the one or more event flags is associated with a respective unselected audio signal of the one or more unselected audio signals; and the user profile comprises preference characteristics of a user;

determine whether the one or more event flags matches a set of preference characteristics of the user profile;

select a first event flag of the one or more event flags in response to a determination that the one or more event flags matches the set of preference characteristics of the user profile, wherein the first event flag is selected based on a degree of matching between the one or more event flags and the set of preference characteristics;

identify a first unselected audio signal associated with the first event flag; and generate a notification signal based on the first unselected audio signal.

14. The vehicle of claim 13, wherein the notification signal causes the vehicle to generate a notification based on the first unselected audio signal.

15. The vehicle of claim 14, wherein the notification comprises a user interface element that is configured to, in response to an interaction with the user interface element, cause the radio system to switch from the selected audio signal to the first unselected audio signal.

16. The vehicle of claim 14, wherein the machine-readable instructions further cause the one or more processors to:

switch the radio system from the selected audio signal to the first unselected audio signal in response to an interaction with the notification;

determine whether the first event flag changes from a first value to a second value;

determine whether the second value matches the set of preference characteristics of the user profile in response to determining that the first event flag changes from the first value to the second value; and switch the radio system from the first unselected audio signal to the selected audio signal in response to the second value not matching the set of preference characteristics of the user profile.

17. The vehicle of claim 13, wherein the preference characteristics indicate a radio genre and an event associated with the radio genre.

18. The vehicle of claim 17, wherein the radio genre is one of a news category, a sports category, and a music category.

\* \* \* \* \*